United States Patent
Chester et al.

(10) Patent No.: US 8,005,221 B2
(45) Date of Patent: *Aug. 23, 2011

(54) CHAOTIC SPREAD SPECTRUM COMMUNICATIONS SYSTEM RECEIVER

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 965 days.

This patent is subject to a terminal disclaimer.

(21) Appl. No.: 11/832,160

(22) Filed: Aug. 1, 2007

(65) Prior Publication Data

US 2009/0034727 A1     Feb. 5, 2009

(51) Int. Cl.
*H04L 9/00* (2006.01)

(52) U.S. Cl. ..................................................... 380/263

(58) Field of Classification Search .................... 380/263
See application file for complete search history.

(56) References Cited

U.S. PATENT DOCUMENTS

| | | | |
|---|---|---|---|
| 3,564,223 A | 2/1971 | Harris et al. | |
| 4,646,326 A | 2/1987 | Backof, Jr. et al. | |
| 4,703,507 A | 10/1987 | Holden | |
| 5,007,087 A | 4/1991 | Bernstein et al. | |
| 5,048,086 A * | 9/1991 | Bianco et al. | 380/28 |
| 5,077,793 A | 12/1991 | Falk et al. | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,598,476 A | 1/1997 | LaBarre et al. | |
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |
| 5,924,980 A | 7/1999 | Coetzee | |
| 5,937,000 A | 8/1999 | Lee et al. | |
| 6,014,446 A | 1/2000 | Finkelstein | |

(Continued)

FOREIGN PATENT DOCUMENTS

EP     0 849 664 A2     6/1998

(Continued)

OTHER PUBLICATIONS

U.S. Appl. No. 11/759,273, David Chester et al.

(Continued)

*Primary Examiner* — Farid Homayounmehr
(74) *Attorney, Agent, or Firm* — Fox Rothschild, LLP; Robert J. Sacco

(57) ABSTRACT

A method is provided for coherently demodulating a chaotic sequence spread spectrum signal at a receiver (104). The method includes receiving a chaotic sequence spread spectrum signal including a plurality of information symbols. The method also includes generating a first string of discrete time chaotic samples. The first string of discrete time chaotic samples is identical to a second string of discrete time chaotic samples generated at a transmitter. The method further includes processing the chaotic sequence spread spectrum signal at the receiver to identify a time offset and a frequency offset relative to the first string of discrete time chaotic samples. Each of the discrete time chaotic samples of the first string of discrete time chaotic samples has a shorter sample time interval than the duration of the information symbols.

23 Claims, 9 Drawing Sheets

U.S. PATENT DOCUMENTS

| | | | |
|---|---|---|---|
| 6,023,612 | A | 2/2000 | Harris et al. |
| 6,038,317 | A | 3/2000 | Magliveras et al. |
| 6,078,611 | A | 6/2000 | La Rosa et al. |
| 6,304,216 | B1 | 10/2001 | Gronemeyer |
| 6,331,974 | B1 | 12/2001 | Yang et al. |
| 6,377,782 | B1 | 4/2002 | Bishop et al. |
| 6,570,909 | B1 | 5/2003 | Kansakoski et al. |
| 6,614,914 | B1 | 9/2003 | Rhoads et al. |
| 6,744,893 | B1* | 6/2004 | Fleming-Dahl .............. 380/263 |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,980,656 | B1 | 12/2005 | Hinton, Sr. et al. |
| 6,986,054 | B2 | 1/2006 | Kaminaga et al. |
| 7,023,323 | B1 | 4/2006 | Nysen |
| 7,027,598 | B1 | 4/2006 | Stojancic et al. |
| 7,069,492 | B2 | 6/2006 | Piret |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,133,522 | B2* | 11/2006 | Lambert ........................ 380/28 |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2* | 9/2007 | Ishihara et al. .............. 380/263 |
| 7,272,168 | B2 | 9/2007 | Akopian |
| 7,277,540 | B1 | 10/2007 | Shiba et al. |
| 7,440,570 | B2* | 10/2008 | Short .............................. 380/44 |
| 7,529,292 | B2 | 5/2009 | Bultan et al. |
| 7,643,537 | B1 | 1/2010 | Giallorenzi et al. |
| 7,779,060 | B2 | 8/2010 | Kocarev et al. |
| 7,830,214 | B2* | 11/2010 | Han et al. ........................ 331/78 |
| 7,853,014 | B2 | 12/2010 | Blakley et al. |
| 7,911,816 | B2* | 3/2011 | Miramonti ..................... 363/97 |
| 2002/0099746 | A1 | 7/2002 | Tie et al. |
| 2003/0044004 | A1 | 3/2003 | Blakley et al. |
| 2004/0001556 | A1 | 1/2004 | Harrison et al. |
| 2004/0059767 | A1 | 3/2004 | Liardet |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0089169 | A1* | 4/2005 | Kim et al. ..................... 380/263 |
| 2005/0207574 | A1 | 9/2005 | Pitz et al. |
| 2005/0274807 | A1 | 12/2005 | Barrus et al. |
| 2006/0072754 | A1 | 4/2006 | Hinton et al. |
| 2006/0123325 | A1 | 6/2006 | Wilson et al. |
| 2006/0209932 | A1 | 9/2006 | Khandekar et al. |
| 2006/0251250 | A1 | 11/2006 | Ruggiero et al. |
| 2007/0121945 | A1 | 5/2007 | Han et al. |
| 2007/0230701 | A1 | 10/2007 | Park et al. |
| 2008/0008320 | A1 | 1/2008 | Hinton et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1* | 10/2008 | Chester et al. ................ 708/446 |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1* | 12/2008 | Chester et al. ................ 380/263 |
| 2008/0307022 | A1 | 12/2008 | Michaels et al. |
| 2008/0307024 | A1 | 12/2008 | Michaels et al. |
| 2009/0034727 | A1* | 2/2009 | Chester et al. ................ 380/263 |
| 2009/0044080 | A1 | 2/2009 | Michaels et al. |
| 2009/0110197 | A1 | 4/2009 | Michaels |
| 2009/0122926 | A1 | 5/2009 | Azenkot et al. |
| 2009/0196420 | A1* | 8/2009 | Chester et al. ................ 380/263 |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0323766 | A1 | 12/2009 | Wang et al. |
| 2009/0327387 | A1 | 12/2009 | Michaels et al. |
| 2010/0091700 | A1* | 4/2010 | Michaels ....................... 370/328 |
| 2010/0111296 | A1 | 5/2010 | Brown et al. |
| 2011/0019817 | A1* | 1/2011 | Michaels et al. ............... 380/38 |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO-2008065191 A1 | 6/2008 |
| WO | WO-2008099367 A2 | 8/2008 |
| WO | WO-2008130973 A1 | 10/2008 |
| WO | WO-2009146283 A1 | 12/2009 |

OTHER PUBLICATIONS

U.S. Appl. No. 11/737,459, David Chester et al.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Yen, et al., (1999) "Residual Number System Assisted CDMA: A New System Concept", In: ACTS'99, Jun. 8-11, 1999, Sorrento, Italy.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Morsche et al., "Signals and Systems," lecture notes, University of Eindhoven, The Netherlands (1999).

Kolumban, et al., "Chaotic Communications with Correlator Receivers: Theory and Performance Limits" Proceedings of the IEEE, vol. 90, No. 5, May 2002.

Michaels, et al., U.S. Appl. No. 12/056,024, filed Mar. 26, 2008, entitled "Selective Noise Cancellation of a Spread Spectrum Signal".

Michaels, et al., U.S. Appl. No. 11/928,013, filed Oct. 30, 2007, entitled "Cryptographic System Configured for Extending a Repetition Period of a Random Sequence".

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Aparicio; "Communications Systems Based on Chaos" May 2007. Universidad Rey Juan Carlos.

Bererber, S.M., et al., "Design of a CDMA System in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1__1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <<http://mathworld.wolfram.com/Bijective.html>>.

Weisstein, E., Surejection:, From MathWorld—AWolfram Web Resource [online] [retrieved on Nov. 8, 2010] Retrieved from the Internet: <<http://mathworld.wolfram.com/surjection.html>>.

Weisstein, E., Surejection:, From MathWorld—AWolfram Web Resource [online] [retrieved on Nov. 8, 2010] Retrieved from the Internet: <http://mathworld.wolfram.com/injection.html>>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Taylor, F.J., "Residue Arithmetic A Tutorial with Examples", Computer, vol. 17, No. 5, pp. 50-62, May 1984, doi: 10.1109/MC. 1984.1659138.

\* cited by examiner

CHAOTIC SPREAD SPECTRUM COMMUNICATIONS SYSTEM RECEIVER

BACKGROUND OF THE INVENTION

1. Statement of the Technical Field

The invention concerns communications systems. More particularly, the invention concerns a chaotic communications system receiver configured to recover the input data from a chaotically spread transmitted signal. This spreading consists of combining an amplitude-and-time-discrete signal with a chaotic sequence.

2. Description of the Related Art

Pseudorandom number generators (PRNG) generally utilize digital logic or a digital computer and one or more algorithms to generate a sequence of numbers. While the output of conventional PRNG may approximate some of the properties of random numbers, they are not truly random. Since the algorithms used for generating pseudorandom sequences are deterministic, such sequences will always be periodic.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Some have proposed the use of multiple pseudo-random number generators to generate a digital chaotic-like sequence. However, such systems only produce more complex pseudo-random number sequences that possess all pseudo-random artifacts and no chaotic properties. While certain polynomials can generate chaotic behavior, it is commonly held that arithmetic required to generate chaotic number sequences requires an impractical implementation due to the precisions required.

Communications systems utilizing chaotic sequences offer promise for being the basis of a next generation of low probability of intercept (LPI) waveforms, low probability of detection (LPD) waveforms, and secure waveforms. While many such communications systems have been developed for generating chaotically modulated waveforms, such communications systems suffer from low throughput. The term "throughput" as used herein refers to the amount of data transmitted over a data link during a specific amount of time. This throughput limitation stems from the fact that a chaotic signal is produced by means of a chaotic analog circuit subject to drift.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift" as used herein refers to a slow long term variation in one or more parameters of a circuit. The problem with such analog circuits is that the inherent drift forces the requirement that state information must be constantly transferred over a communication channel to keep a transmitter and receiver synchronized.

The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

The alternative to date has been to implement non-coherent chaotic waveforms. However, non-coherent waveform based communication systems suffer from reduced throughput and error rate performance. In this context, the phrase "non-coherent waveform" means that the receiver is not required to reproduce any synchronized copy of the chaotic signals that have been generated in the transmitter. The phrase "communications using a coherent waveform" means that the receiver is required to reproduce a synchronized copy of the chaotic signals that have been generated in the transmitter.

In view of the forgoing, there is a need for a coherent chaos-based communications system having an increased throughput. There is also a need for a chaos-based communications system configured for generating a signal having chaotic properties. As such, there is further a need for a chaos-based communications system that corrects drift between a transmitter and a receiver without an extreme compromise of throughput.

SUMMARY OF THE INVENTION

A method is provided for coherently demodulating a chaotic sequence spread spectrum signal at a receiver. The method includes receiving a chaotic sequence spread spectrum signal including a plurality of information symbols at the receiver. The method also includes generating a first string of discrete time chaotic samples at the receiver. The first string of discrete time chaotic samples is generated by: selecting a plurality of polynomial equations; using residue number system (RNS) arithmetic operations to respectively determine solutions for the polynomial equations; and determining a series of digits in a weighted number system based on the RNS residue values. The solutions are iteratively computed and expressed as RNS residue values. The method further includes processing the chaotic sequence spread spectrum signal at the receiver to identify a time offset and a frequency offset relative to the first string of discrete time chaotic samples. Each of the discrete time chaotic samples has a shorter sample time interval than the duration of the information symbols.

According to an aspect of the invention, the first string of discrete time chaotic samples is identical to a second string of discrete time chaotic samples generated at a transmitter. The method also includes utilizing an accurate time reference to minimize a timing difference uncertainty and a frequency difference uncertainty between the first string of discrete time chaotic samples and the second string of discrete time chaotic samples. The method further includes a correlating step. The correlating step involves correlating the chaotic sequence spread spectrum signal with the first string of discrete time chaotic samples to obtain correlation outputs. The correlating step is performed at a symbol rate on symbol boundaries or at a symbol rate offset from symbol boundaries.

According to another aspect of the invention, the method involves processing the correlation outputs to produce a plurality of soft symbol decisions, to track a symbol timing, to track a plurality of timing offsets, to track a plurality of frequency offsets, to track a plurality of phase offsets, and to track the strength of the received chaotic sequence spread spectrum signal. The soft symbol decisions are processed to form hard symbol decisions. The tracked timing offset information is used to adjust a timing of the receiver, to control a re-sampling of the chaotic sequence spread spectrum signal, or to control a re-sampling of the first string of discrete time chaotic samples. The tracked frequency offset information is used to adjust a local oscillator so that a frequency of the local oscillator matches a frequency of the chaotic sequence spread spectrum signal. The tracked phase offset information is used to correct a phase offset between the chaotic sequence spread spectrum signal and the first string of discrete time chaotic samples. The tracked received signal strength information is used to adjust a gain of an amplifier configured for amplifying the chaotic sequence spread spectrum signal.

A chaotic spread spectrum communications system (CSSCS) receiver is also provided. The CSSCS receiver is configured for coherently demodulating a chaotic sequence spread spectrum signal. The CSSCS receiver is comprised of a receiving means, a chaotic sequence generator, and a processing means. The receiving means is configured to receive a chaotic sequence spread spectrum signal including a plurality of information symbols. The chaotic sequence generator is configured to generate a first string of discrete time chaotic samples. The first string of discrete time chaotic samples is identical to a second string of discrete time chaotic samples generated at a transmitter. The processing means is configured to process the chaotic sequence spread spectrum signal for identifying a time offset and a frequency offset relative to the first string of discrete time chaotic samples. Each of the discrete time chaotic samples has a shorter sample time interval than the duration of the information symbols.

The chaotic sequence generator is comprised of a computing means and a mapping means. The computing means is configured to use residue number system (RNS) arithmetic operations to respectively determine solutions for a plurality of polynomial equations. The solutions are iteratively computed and expressed as RNS residue values. The mapping means is configured to determine a series of digits in a weighted number system based on the RNS residue values.

According to an aspect of the invention, the CSSCS receiver is further comprised of an accurate time reference, a correlator, a hard decision device, and a loop control circuit. The accurate time reference is configured to minimize a timing difference uncertainty and a frequency difference uncertainty between the first string of discrete time chaotic samples and the second string of discrete time chaotic samples. The correlator is configured to correlate the chaotic sequence spread spectrum signal with the first string of discrete time chaotic samples to obtain correlation outputs. The correlator is also configured to correlate the chaotic sequence spread spectrum signal with the first string of discrete time chaotic samples at a symbol rate on symbol boundaries or at a symbol rate offset from symbol boundaries. The correlator is further configured to process the correlation outputs to produce a plurality of soft symbol decisions. The hard decision device is configured to process the soft symbol decisions to form hard symbol decisions.

The loop control circuit is configured to track symbol timing, timing offsets, frequency offsets, phase offsets, and the strength of the received chaotic sequence spread spectrum signal. The loop control circuit is also configured to adjust a timing of the receiving means utilizing tracked timing offset information. The loop control circuit is further configured to control a re-sampling of the chaotic sequence spread spectrum signal and/or a re-sampling of the first string of discrete time chaotic samples. The loop control circuit is configured to adjust a local oscillator utilizing tracked frequency offset information. This adjustment is performed so that a frequency of the local oscillator matches a frequency of the chaotic sequence spread spectrum signal. The loop control circuit is configured to correct a phase offset between the chaotic sequence spread spectrum signal and the first string of discrete time chaotic samples utilizing tracked phase offset information. The loop control circuit is configured to adjust a gain of an amplifier utilizing tracked received signal strength information.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
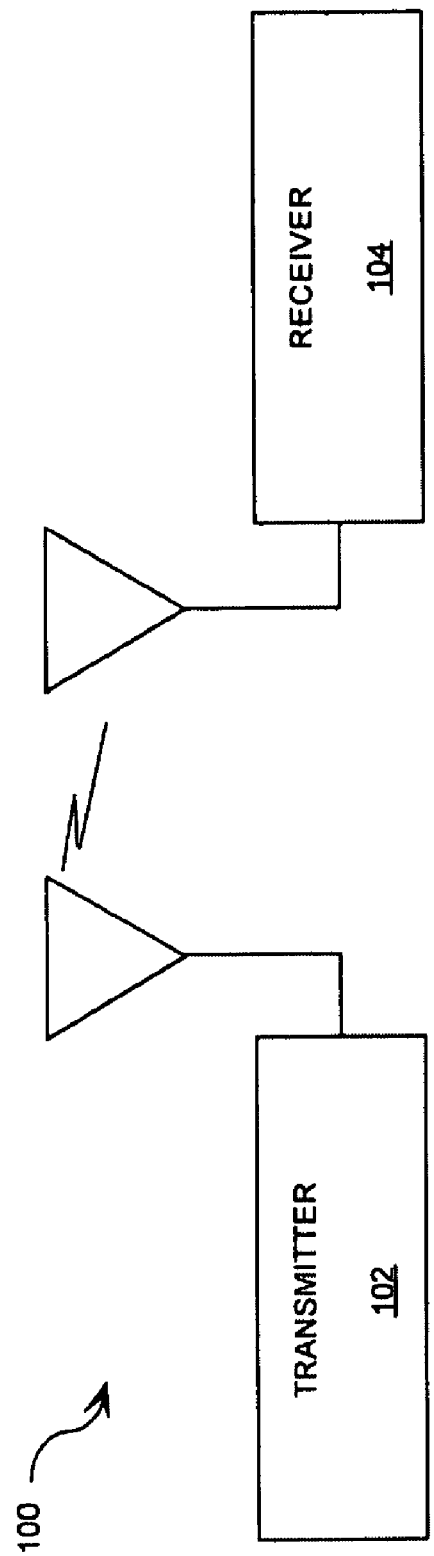
FIG. 1 is a block diagram of a coherent chaotic spread-spectrum communication system that is useful for understanding the invention.

An embodiment of the present invention will now be described with respect to FIG. 1 through FIG. 9. Some embodiments of the present invention provide a coherent chaotic spread-spectrum communications system for phase shift keying (PSK) symbols. The coherent chaotic spread-spectrum communications system's transmitter is configured to generate an output signal having chaotic properties, i.e., an output signal having its frequency spectrum varied over time. It should be appreciated that such a spread-spectrum communications system disclosed herein has many advantages as compared to conventional spread-spectrum communications systems. The spread-spectrum communications system disclosed herein also has many advantages over chaos based spread spectrum systems utilizing analog based chaotic sequence generators. The spread-spectrum communications system disclosed herein corrects drift between a transmitter and a receiver without an extreme compromise of throughput.

The communication receiver disclosed herein utilizes a coherent chaotic sequence spread spectrum (CCSSS) method. Prior to being transmitted, data symbols are combined with a higher rate chaotic sequence (analogous to the binary PN spreading sequence known as a chipping code in traditional direct sequence spread spectrum systems) that spreads the spectrum of the data according to a spreading ratio. The resulting signal resembles a truly random signal, but this randomness can be removed at the receiving end to recover the original data. In particular, the data is recovered by despreading or de-randomizing the received signal using the same chaotic sequence which is generated at a transmitter. The CCSSS system in relation to FIG. 1 and the CCSSS transmitter in relation to FIG. 2 encodes a baseband carrier with PSK symbols. The channel encoding is one of two operations commonly known as modulation. The other operation commonly known as modulation is mixing times a local oscillator or other sequence which results in frequency translation and is also used herein. The CCSSS system also modulates the phase modulated carrier in a chaotic manner utilizing a string of discrete time chaotic samples. The discrete time chaotic samples shall hereinafter be referred to as "chips". As will be appreciated by those familiar with direct sequence spread spectrum (DSSS) systems, each chip will generally have a much shorter sample time interval than the duration of each of the information symbols. Thus, it will be understood that the carrier is modulated using the chaotic sequence chips. Moreover, it will be understood that the chip rate associated with the chaotic sequence is much higher than the symbol rate. It should also be understood that the chaotic sequence of chips which are utilized for generating the transmitted signal is known a priori by the receiver. Consequently, the same chaotic sequence can be used at the receiver to reconstruct the non-spread carrier or remove the effect of spreading at the receiver.

Referring now to FIG. 1, there is provided a coherent chaotic spread-spectrum communication system 100 that is useful for understanding the present invention. The coherent chaotic spread-spectrum communication system 100 is comprised of a transmitter 102 and a receiver 104. The transmitter 102 is configured to generate an amplitude-and-time-discrete baseband signal and to spread the amplitude-and-time-discrete baseband signal over a wide intermediate frequency band. This spreading consists of multiplying the amplitude-and-time-discrete baseband signal by a digital chaotic sequence. The product of this arithmetic operation is hereinafter referred to as a digital chaotic signal. In this regard, it should be understood that the transmitter 102 is also configured to process the digital chaotic signal to place the same in a proper analog form suitable for transmission over a communications link. The transmitter 102 is further configured to communicate analog chaotic signals to the receiver 104 via a communications link.

The receiver 104 is configured to receive transmitted analog chaotic signals from the transmitter 102. The receiver 104 is also configured to down convert, digitize, and de-spread a transmitted analog chaotic signal by correlating it with a replica of the chaotic sequence generated at the transmitter 102. The chaotic sequence is also time synchronized to the transmitted analog chaotic signal, i.e., a sampling rate of the chaotic sequence is the same as a sampling rate of the transmitted analog chaotic signal and is synchronized with a clock (not shown) of the transmitter 102. The output of the arithmetic operation that de-spreads the received signal is hereinafter referred to as a de-spread signal. In this regard, it should be understood that the receiver 104 is further configured to process a de-spread signal for obtaining data contained therein. The receiver 104 is configured to convert the data into text, sound, pictures, navigational-position information, and/or any other type of useful payload information that can be communicated. The receiver 104 is described in greater detail below in relation to FIGS. 6 through 9.

Figure 2:
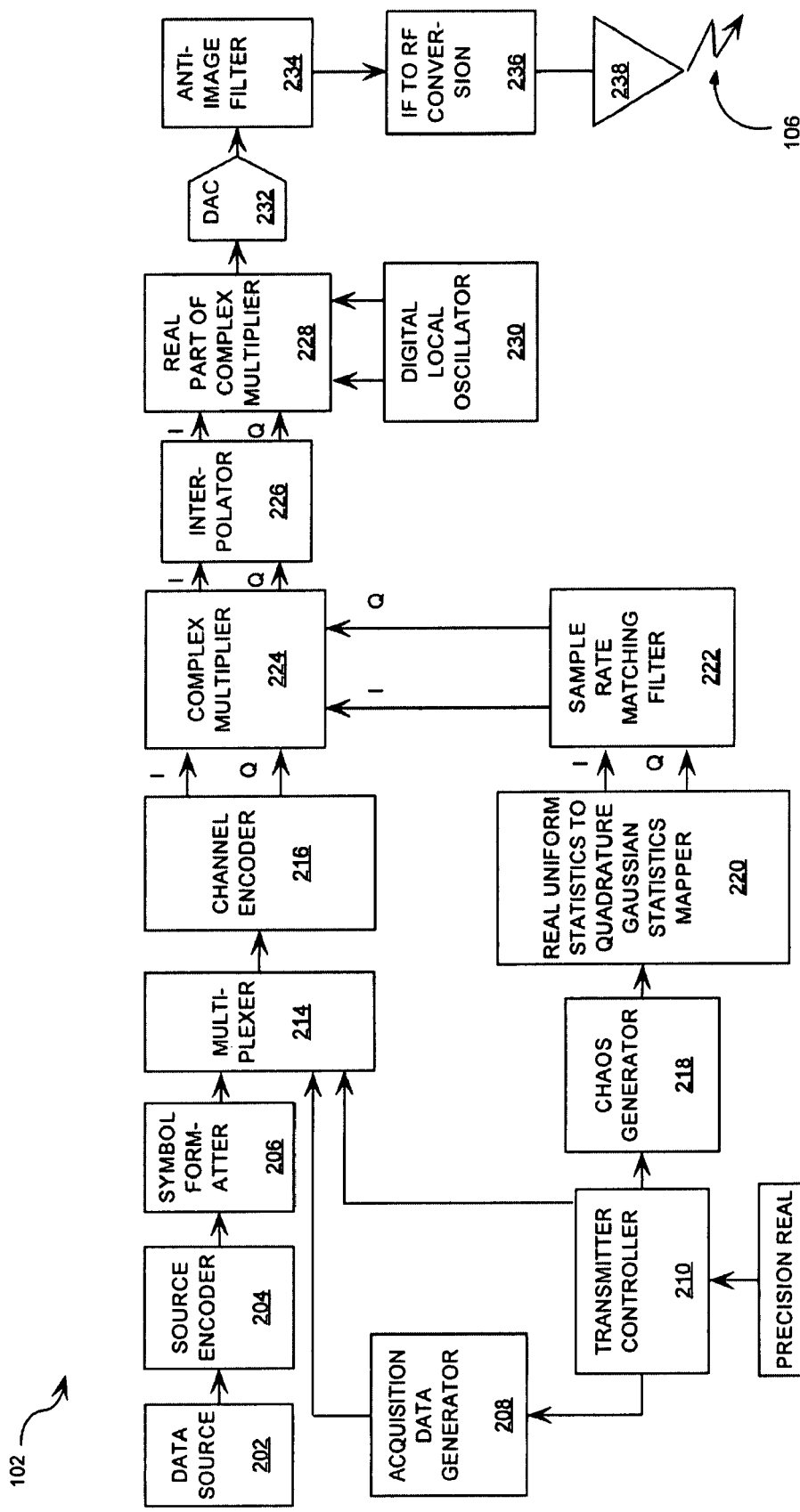
FIG. 2 is a block diagram of the transmitter shown in FIG. 1 that is useful for understanding the invention.

Referring now to FIG. 2, there is provided a bock diagram of the transmitter 102 shown in FIG. 1 that is useful for understanding the invention. It should be noted that the embodiment of FIG. 2 assumes that: (1) a low order phase shift keying (PSK) data modulation is used; (2) no pulse shaping is applied to data symbols; (3) modulated data symbols are generated in quadrature form; and (4) chaotic spectral spreading is performed at an intermediate frequency (IF).

Referring again to FIG. 2, the transmitter 102 is comprised of a data source 202. The transmitter 102 is also comprised of a source encoder 204, a symbol formatter 206, an acquisition data generator 208, a transmitter controller 210, a multiplexer 214, a channel encoder 216, a precision real time reference 212, and a digital complex multiplier 224. The transmitter 102 is further comprised of a chaos generator 218, a real uniform statistics to quadrature Gaussian statistics mapper device (RUQG) 220, and a sample rate matching filter (SRMF) 222. The transmitter 102 is further comprised of an interpolator 226, a digital local oscillator (LO) 230, a real part of a complex multiplier 228, a digital-to-analog converter (DAC) 232, an anti-image filter 234, an intermediate frequency (IF) to radio frequency (RF) conversion device 236, and an antenna element 238. Each of the above listed components 202-216, 220-238 are well known to persons skilled in the art, and therefore these components will not be described in great detail herein. However, a brief discussion of the transmitter 102 architecture is provided to assist a reader in understanding the present invention.

Referring again to FIG. 2, the data source 202 is configured to receive bits of data from an external data source (not shown). In this regard, it should be appreciated that the data source 202 is an interface configured for receiving an input signal containing data from an external device (not shown). The data source 202 is further configured to supply bits of data to the source encoder 204 at a particular data transfer rate. The source encoder 204 can be configured to encode the data received from the external device (not shown) using a forward error correction coding scheme. The bits of data received at or generated by the source encoder 204 represent any type of information that may be of interest to a user. For example, the data can be used to represent text, telemetry, audio, or video data. The source encoder 204 is further configured to supply bits of data to the symbol formatter 206 at a particular data transfer rate.

The symbol formatter 206 is configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then the symbol formatter 204 can also be configured to differentially encode formed PSK symbols. Differential encoding is well known to persons skilled in the art and therefore will not be described in great detail herein. The symbol formatter 206 can be further configured to communicate non-differentially encoded PSK symbols and/or differentially encoded PSK symbols to the multiplexer 214. Still, the invention is not limited in this regard. The symbol formatter 206 is functionally similar to a serial in/parallel out shift register where the number of parallel bits out is equal to log base two ($\log_2$) of the order of the channel encoder 216.

The transmitter 102 also includes an acquisition data generator 208 capable of generating a "known data preamble" that can be used to enable initial synchronization of a chaotic sequence generated in the transmitter 102 and the receiver 104. The duration of this "known data preamble" is determined by an amount required by the receiver 104 to synchronize with the transmitter 102 under known worst case channel conditions. In some embodiments of the invention, the "known data preamble" is a repetition of the same known symbol. In other embodiments of the invention, the "known data preamble" is a series of known symbols. The acquisition data generator 208 can be further configured to communicate the "known data preamble" to the multiplexer 214.

Referring again to FIG. 2, the multiplexer 214 is configured to receive the binary word to be modulated by the channel encoder from the symbol formatter 206. The multiplexer 214 is also configured to receive a "known data preamble" from the acquisition data generator 208. The multiplexer 214 is coupled to the transmitter controller 210. The transmitter controller 210 is configured to control the multiplexer 214 so that the multiplexer 214 routes the "known data preamble" to the channel encoder 216 at the time of a new transmission.

According to another embodiment of the invention, the "known data preamble" may be injected at known intervals to aid in periodic resynchronization of the chaotic sequence generated in the transmitter 102 and the receiver 104. This would typically be the case for an implementation meant to operate in harsh channel conditions. Still, the invention is not limited in this regard.

Referring again to FIG. 2, the multiplexer 214 is configured to select the data symbols to be routed to the channel encoder 216 after a preamble period has expired. The multiplexer 214 is also configured to communicate the data symbols to the channel encoder 216. In this regard, it should be appreciated that a communication of the data symbols to the channel encoder 216 is delayed by a time defined by the length of the "known data preamble." As should be appreciated, this delay allows all of a "known data preamble" to be fully communicated to the channel encoder 216 prior to communication of the data symbols.

Referring again to FIG. 2, the channel encoder 216 is configured to perform actions for representing the "known data preamble" and the data symbols in the form of a modulated amplitude-and-time-discrete digital signal. The modulated amplitude-and-time-discrete digital signal is defined by digital words which represent intermediate frequency (IF) modulated symbols comprised of bits of data having a one (1) value or a zero (0) value. Methods for representing digital symbols by an amplitude-and-time-discrete digital signal are well known to persons skilled in the art. Thus, such methods will not be described in great detail herein. However, it should be appreciated that the channel encoder 216 can employ any such method. For example, the channel encoder 216 can be selected as a digital baseband modulator employing quadrature phase shift keying (QPSK). As will be appreciated by those skilled in the art, the output of the QPSK modulator will include an in-phase ("I") data and quadrature phase ("Q") data. The I and Q data will be thereafter communicated to the digital complex multiplier 224.

The transmitter 102 is further comprised of a sample rate matching device (not shown) between the channel encoder 216 and the digital complex multiplier 224. The sample rate matching device (not shown) is provided for re-sampling the amplitude-and-time-discrete digital signal. As should be appreciated, the sample rate matching device (not shown) performs a sample rate increase on the amplitude-and-time-discrete digital signal so that a sample rate of the amplitude-and-time-discrete digital signal is the same as a digital chaotic sequence communicated to the digital complex multiplier 224.

Referring again to FIG. 2, the digital complex multiplier 224 performs a complex multiplication in the digital domain. In the digital complex multiplier 224, the amplitude-and-time-discrete digital signal from the channel encoder 216 is multiplied by a digital representation of a chaotic sequence. The chaotic sequence is generated in the chaos generator 218. The rate at which the digital chaotic sequence is generated is an integer multiple of a data symbol rate. The greater the ratio between the data symbol period and the sample period of the digital chaotic sequence, the higher a spreading gain. The chaos generator 218 communicates the chaotic sequence to the RUQG 220. The RUQG 220 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 220 may take in two (2) uniformly distributed real inputs from the chaos generator 218 and convert those via a complex-valued bivariate Gaussian transformation to a quadrature output having statistical characteristics of a Gaussian distribution. Such conversions are well understood by those skilled in the art, and therefore will not be described in great detail herein. However, it should be understood that such techniques may use nonlinear processors, look-up tables, iterative processing (CORDIC functions), or other similar mathematical processes. The RUQG 220 is further configured to communicate transformed chaotic sequences to the SRMF 222.

The statistically transformed output of the digital chaotic sequence has a multi-bit resolution consistent with a resolution of the DAC 232. The RUQG 220 communicates the statistically transformed output of the digital chaotic sequence to the SRMF 222. For example, the RUQG 220 communicates an in-phase ("I") data and quadrature phase ("Q") data to the SRMF 222 when the channel encoder 216 is configured to yield a complex output representation.

If a chaos sample rate of the transformed chaotic sequence is different than a sample rate of the amplitude-and-time-discrete digital signal, then the two rates must be matched. The chaotic sequence can therefore be resampled in the SRMF 222. For example, SRMF 222 can be comprised of a real sample rate matching filter to resample each of the in-phase and quadrature-phase processing paths of the chaotic sequence. As should be appreciated, the SRMF 222 performs a sample rate change on the transformed digital chaotic sequence so that a sample rate of the transformed digital chaotic sequence is the same as an amplitude-and-time-discrete digital signal communicated to the digital complex multiplier 224 from the channel encoder 216. The SRMF 222 is also configured to communicate a resampled, transformed digital chaotic sequence to the digital complex multiplier 224.

The RUQG 220 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical Equations (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where {u1, u2} are uniformly distributed independent input random variables and {$G_1$, $G_2$} are Gaussian distributed output random variables. In such a scenario, the SRMF 222 is comprised of one sample rate matching filter to resample an in-phase ("I") data sequence and a second sample rate matching filter to resample a quadrature-phase ("Q") data sequence. The SRMF 222 is configured to communicate a resampled, transformed digital chaotic sequence to the digital complex multiplier 224. More particularly, the SRMF 222 communicates an in-phase ("I") data and quadrature phase ("Q") data to the digital complex multiplier 224.

The digital complex multiplier 224 performs a complex multiplication on the digital chaotic sequence output from the SRMF 222 and the amplitude-and-time-discrete digital signal output from the channel encoder 216. The resulting output is a digital representation of a coherent chaotic sequence spread spectrum modulated IF signal in which the digital data from the channel encoder 216 has been spread over a wide frequency bandwidth in accordance with a chaotic sequence generated by the chaos generator 218.

The digital complex multiplier 224 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. The digital complex multiplier 224 is also configured to communicate digital chaotic output signals to the interpolator 226.

The interpolator 226, real part of complex multiplier 228 and quadrature digital local oscillator 230 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those skilled in the art, and therefore will not be discussed in detail here. The interpolator 226 accepts an input from the complex multiplier 224. The modulated symbols are in quadrature form and the interpolator is implemented as two real interpolators.

The interpolator 226 raises the sample rate of the amplitude-and-time-discrete digital signal received from the complex multiplier 224 to a rate compatible with the bandwidth and center frequency of the second intermediate frequency (IF). The digital local oscillator 230 generates a complex quadrature amplitude-and-time-discrete digital sinusoid at a frequency which shall translate the first intermediate frequency (IF) to a desired second intermediate frequency (IF). The digital local oscillator 230 is also configured to pass its output to the real part of complex multiplier 228.

The real part of complex multiplier 228 is configured to accept as its inputs the quadrature output of the interpolator 228 and the quadrature output of the digital local oscillator 230. The real part of a complex multiplication is passed so that the real part of complex multiplier 228 implements only the real output portion of a complex multiplication. The real part of complex multiplier 228 is configured to pass its output to the DAC 232.

Referring again to FIG. 2, the IF translator and specifically the real part of the complex multiplier 228 are configured to communicate a sampled digital chaotic output signal (i.e., a digital chaotic output signal having an increased sampling rate and non-zero intermediate frequency) to the DAC 232. The DAC 232 is configured to convert a sampled digital chaotic output signal to an analog signal. The DAC 232 is also configured to communicate an analog signal to the anti-image filter 234.

In some applications, it can be desirable to change a sampling rate at the output of the digital complex multiplier 224 only, for example when using an interpolating DAC. An IF translator consisting of an interpolator 226 only can be provided for this purpose.

The digital complex multiplier 224 multiplies I and Q data of an amplitude-and-time-discrete digital signal by I and Q data of digital chaotic sequence to obtain a digital chaotic output signal. The digital chaotic output signal is a quadrature, zero IF signal. The digital complex multiplier 224 communicates the quadrature, zero IF signal to the IF translator. The IF translator is an interpolation filter 226 only. The interpolation filter 226 is comprised of dual real interpolators which change the sample rate of the quadrature, zero IF signal to a predetermined rate, such as seventy (70) mega sample per second. The interpolation filter 226 communicates the sampled, quadrature, zero IF signal to the DAC 232. The DAC 232 is an interpolating DAC that increases the effective sample rate. The DAC 232 interpolates the received zero IF signal to a two hundred eighty (280) mega sample per second sample rate. The DAC 232 also up converts a real output component by a factor of the interpolated sample frequency (two hundred eighty (280) mega sample per second) divided four (4) before conversion to an analog signal. The output of the DAC 232 is thus a real signal centered at a seventy (70) mega hertz intermediate frequency with a first image centered at two hundred ten (210) mega hertz. Still, the invention is not limited in this regard.

Referring again to FIG. 2, the anti-image filter 234 is configured to remove spectral images from the analog signal to form a smooth time domain signal. The anti-image filter 234 is also configured to communicate a smooth time domain signal to a RF translator 236. The RF translator 236 is a wide bandwidth analog IF to RF up converter. The RF translator 236 is configured to center a smooth time domain signal at an RF for transmission thereby forming an RF signal. The RF translator 236 is also configured to communicate the RF signal to the power amplifier (not shown). The power amplifier (not shown) is configured to amplify a received RF signal. The power amplifier (not shown) is configured to communicate the amplified RF signal to the antenna element 238 for communication to a receiver 104 (described below in relation to FIGS. 6 through 9).

It should be understood that the digital generation of the digital chaotic sequence at the transmitter 102 and receiver 104 is kept closely coordinated under the control of a precision real time reference 212 clock. The higher the precision of the clock 212, the closer the synchronization of the chaos generator 218 of the transmitter 102 and the chaos generator (described below in relation to FIGS. 6 through 9) of the receiver 104 shall be excluding the effects of processing delay differences and channel propagation times. The use of a precision real time reference allows the states of the chaos generators to be easily controlled with precision.

Referring again to FIG. 2, the precision real time reference 212 is a stable local oscillator locked to a precision real time reference, such as a GPS clock receiver or a chip scale atomic clock (CSAC). The precision real time reference 212 is configured to supply a high frequency clock to the clocked logic circuits 206, . . . , 232 while being locked to a lower frequency reference clock. The lower frequency reference clock supplies a common reference and a common real time of day reference to prevent a large drift between the states of the chaos generator 218 and the chaos generator (described below in relation to FIGS. 6 through 9) of the receiver 104 over an extended time interval.

A person skilled in the art will appreciate that the transmitter 102 of FIG. 1 is one example of a communications system transmitter. As another example, other architectures may employ additional chaotic sequence generators to provide a switched chaotic output or to control other aspects of the transmitter 102.

Chaos Generators and Digital Chaotic Sequence Generation

Figure 3:
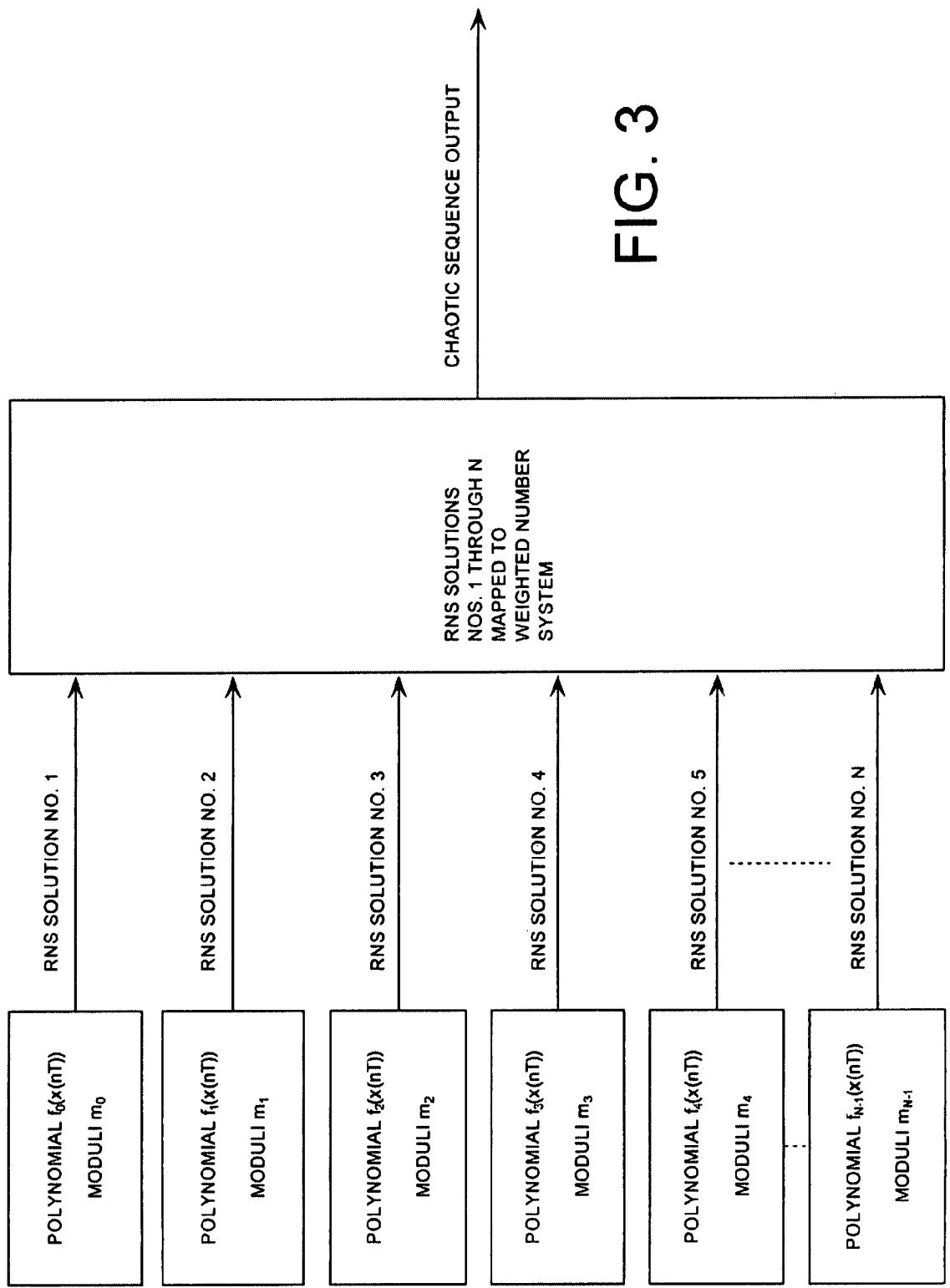
FIG. 3 is a conceptual diagram of the chaos generators of FIGS. 2, 6-9 that is useful for understanding the invention.

Referring now to FIG. 3, there is provided a conceptual diagram of the chaos generator 218 of FIG. 2 that is useful for understanding the invention. It should be appreciated that a chaos generator of the receiver 104 is the same or substantially similar to the chaos generator 218. As such, the following description is sufficient for understanding a chaos generator (described below in relation to FIGS. 6 through 9) employed by the receiver 104.

As shown in FIG. 3, generation of the chaotic sequence begins with N polynomial equations $f_0(x(nT)), \ldots, f_{N-1}(x(nT))$. The N polynomial equations $f_0(x(nT)), \ldots, f_{N-1}(x(nT))$ can be selected as the same polynomial equation or as different polynomial equations. According to an aspect of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field [GF]. For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT))\cdot h(x(nT))$.

As will be understood by a person skilled in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons skilled in the art. Thus, such operations will not be described in great detail herein. However, it should be appreciated that a RNS residue representation for some weighted value "a" can be defined by mathematical Equation (3).

$$R=\{a \text{ modulo } m_0, a \text{ modulo } m_1, \ldots, a \text{ modulo } m_{N-1}\} \quad (3)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, M_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{N-1}$ as a moduli $m_0, m_1, \ldots, m_{N-1}$.

Those skilled in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (4).

$$f(x(nT))=Q(k)x^3(nT)+R(k)x^2(nT)+S(k)x(nT)+C(k,L) \quad (4)$$

where n is a sample time index value. k is a polynomial time index value. L is a constant component time index value. T is a fixed constant having a value representing a time interval or increment. Q, R, and S are coefficients that define the polynomial equation $f(x(nT))$. C is a coefficient of $x(nT)$ raised to a zero power and is therefore a constant for each polynomial characteristic. In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)), \ldots, f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |

TABLE 1-continued

| Moduli values $m_0, m_1, \ldots, m_{N-1}$: | Sets of constant values $C_0, C_1, \ldots, C_{N-1}$: |
|---|---|
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 3 will depend on the quantity of polynomial equations N and the modulus values $m_0, m_1, \ldots, m_{N-1}$ selected for the RNS number systems. In particular, this value can be calculated as the product $M = m_0 \cdot m_1, \cdot m_3 \cdot m_4 \cdot \ldots \cdot M_{N-1}$.

Referring again to FIG. 3, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with particular moduli.

According to an embodiment of the invention, each binary sequence representing a residue value has a bit length (BL) defined by a mathematical Equation (5).

$$BL = \text{Ceiling}[\text{Log } 2(m)] \quad (5)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3{,}563{,}762{,}191{,}059{,}523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of every M times T seconds, i.e., a sequence repetition times an interval of time between exact replication of a sequence of generated values. Still, the invention is not limited in this regard.

Referring again to FIG. 3, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } 1 \neq 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ values are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, \quad a_2 = \left\langle \left\lfloor \frac{x}{m_1} \right\rfloor \right\rangle_{m_2}, \quad a_3 = \left\langle \left\lfloor \frac{x}{m_1 m_2} \right\rfloor \right\rangle_{m_3}$$

and in general for $i > 1$ $$a_i = \left\langle \left\lfloor \frac{x}{m_1 m_2 \ldots m_{i-1}} \right\rfloor \right\rangle_{m_i}.\text{"}$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. The first known formulation of the Chinese Remainder Theorem is attributed to Sunzi in his "Book of Arithmetics" circa 500 A.D. However, a brief discussion of how the CRT is applied may be helpful for understanding the invention. The CRT arithmetic operation can be defined by a mathematical Equation (6) [returning to zero (0) based indexing].

$$Y = \left\{ \left\langle \left[ \begin{array}{c} 3x_0^3((n-1)T) + 3x_0^2((n-1)T) + \\ x_0((n-1)T) + C_0(nT) \end{array} \right] b_0 \right\rangle_{p_0} \frac{M}{p_0} + \ldots + \left\langle \left[ \begin{array}{c} 3x_{N-1}^3((n-1)T) + 3x_{N-1}^2((n-1)T) + \\ x_{N-1}((n-1)T) + C_{N-1}(nT) \end{array} \right] b_{N-1} \right\rangle_{p_{N-1}} \frac{M}{p_{N-1}} \right\}_M \quad (6)$$

Mathematical Equation (6) can be re-written as mathematical Equation (7).

$$Y = \left\{ \left\langle \left[ \begin{array}{c} 3x_0^3((n-1)T) + 3x_0^2((n-1)T) + \\ x_0((n-1)T) + C_0(nT) \end{array} \right] b_0 \right\rangle_{p_0} \frac{M}{p_0} + \ldots + \left\langle \left[ \begin{array}{c} 3x_{N-1}^3((n-1)T) + 3x_{N-1}^2((n-1)T) + \\ x_{N-1}((n-1)T) + C_{N-1}(nT) \end{array} \right] b_{N-1} \right\rangle_{p_{N-1}} \frac{M}{p_{N-1}} \right\}_M \quad (7)$$

where Y is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime numbers. M is a fixed constant defined by a product of the relatively prime numbers $p_0, p_1, \ldots, p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \mod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, the $b_j$'s can be defined as $$b_j = \left(\frac{M}{p_j}\right)^{-1} \mod p_j.$$

In other embodiments of the present invention, all $b_j$'s can be set equal to one or more non-zero values without loss of the chaotic properties.

As should be appreciated, the chaotic sequence output Y can be expressed in a binary number system representation. As such, the chaotic sequence output Y can be represented as a binary sequence. Each bit of the binary sequence has a zero (0) value or a one (1) value. The chaotic sequence output Y can have a maximum bit length (MBL) defined by a mathematical Equation (8).

MBL=Ceiling[Log 2(M)]  (8)

where M is the product of the relatively prime numbers $p_0, p_1, \ldots, p_{N-1}$ selected as moduli $m_0, m_1, \ldots, M_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059, 523). By substituting the value of M into Equation (6), the bit length (BL) for a chaotic sequence output Y expressed in a binary system representation can be calculated as follows: BL=Ceiling/Log 2(3,563,762,191,059,523)=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059, 522), inclusive. Still, the invention is not limited in this regard. For example, chaotic sequence output Y can be a binary sequence representing a truncated portion of a value between zero (0) and M−1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (4) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot1\text{ ms}))=3x^3((n-1)\cdot1\text{ ms})+3x^2((n-1)\cdot1\text{ ms})+x((n-1)\cdot1\text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six (46) is obtained. In a second iteration, n is incremented by one (1) and x equals the value of the first solution, i.e., forty-six (46) resulting in the solution 298, 410 mod 503 or one hundred thirty-one (131). In a third iteration, n is again incremented by one (1) and x equals the value of the second solution.

Figure 4:
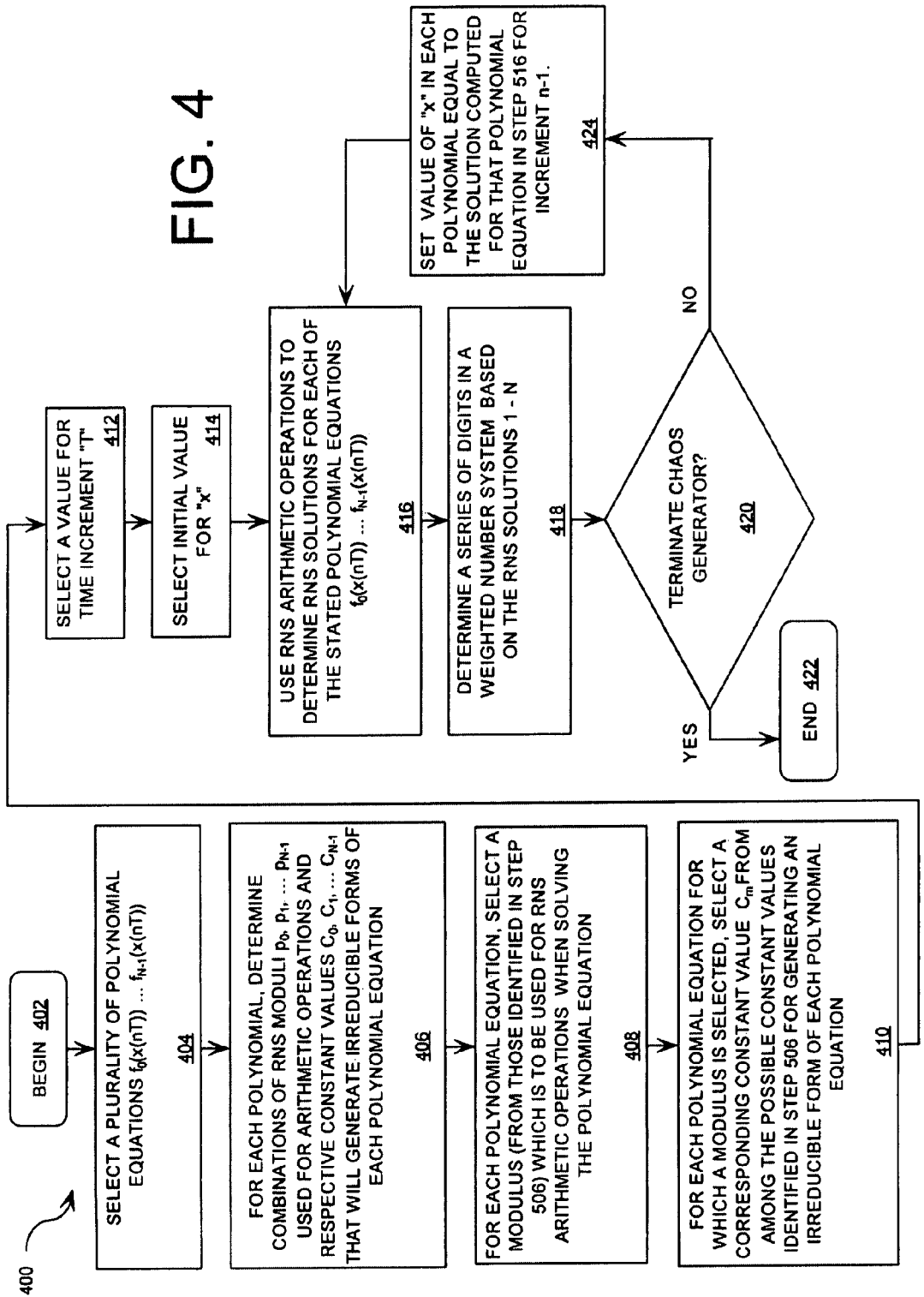
FIG. 4 is a flow diagram of a method for generating a chaotic sequence that is useful for understanding the invention.

Referring now to FIG. 4, there is provided a flow diagram of a method 400 for generating a chaotic sequence that is useful for understanding the invention. As shown in FIG. 4, the method 400 begins with step 402 and continues with step 404. In step 404, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 404, step 406 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 408, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 406. It should also be appreciated that a different modulus must be selected for each polynomial equation $f_0(x(nT)), \ldots, f_{N-1}(x(nT))$.

As shown in FIG. 4, the method 400 continues with a step 410. In step 410, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 406 for generating an irreducible form of the respective polynomial equation $f_0(x(nT)), \ldots, f_{N-1}(x(nT))$.

After step 410, the method 400 continues with step 412. In step 412, a value for time increment "T" is selected. Thereafter, an initial value for "x" is selected. In this regard, it should be appreciated that the initial value for "x" can be any value allowable in a residue ring. Subsequently, step 416 is performed where RNS arithmetic operations are used to iteratively determine RNS solutions for each of the stated polynomial equations $f_0(x(nT)), \ldots, f_{N-1}(x(nT))$. In step 418, a series of digits in a weighted number system are determined based in the RNS solutions. This step can involve performing a mixed radix: arithmetic operation or a CRT arithmetic operation using the RNS solutions to obtain a chaotic sequence output.

After step 418, the method 400 continues with a decision step 420. If a chaos generator is not terminated (420:NO), then step 424 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 416. Subsequently, the method 400 returns to step 416. If the chaos generator is terminated (520:YES), then step 422 is performed where the method 400 ends.

A person skilled in the art will appreciate that the method 400 is one example of a method for generating a chaotic sequence. However, the invention is not limited in this regard and any other method for generating a chaotic sequence can be used without limitation.

Figure 5:
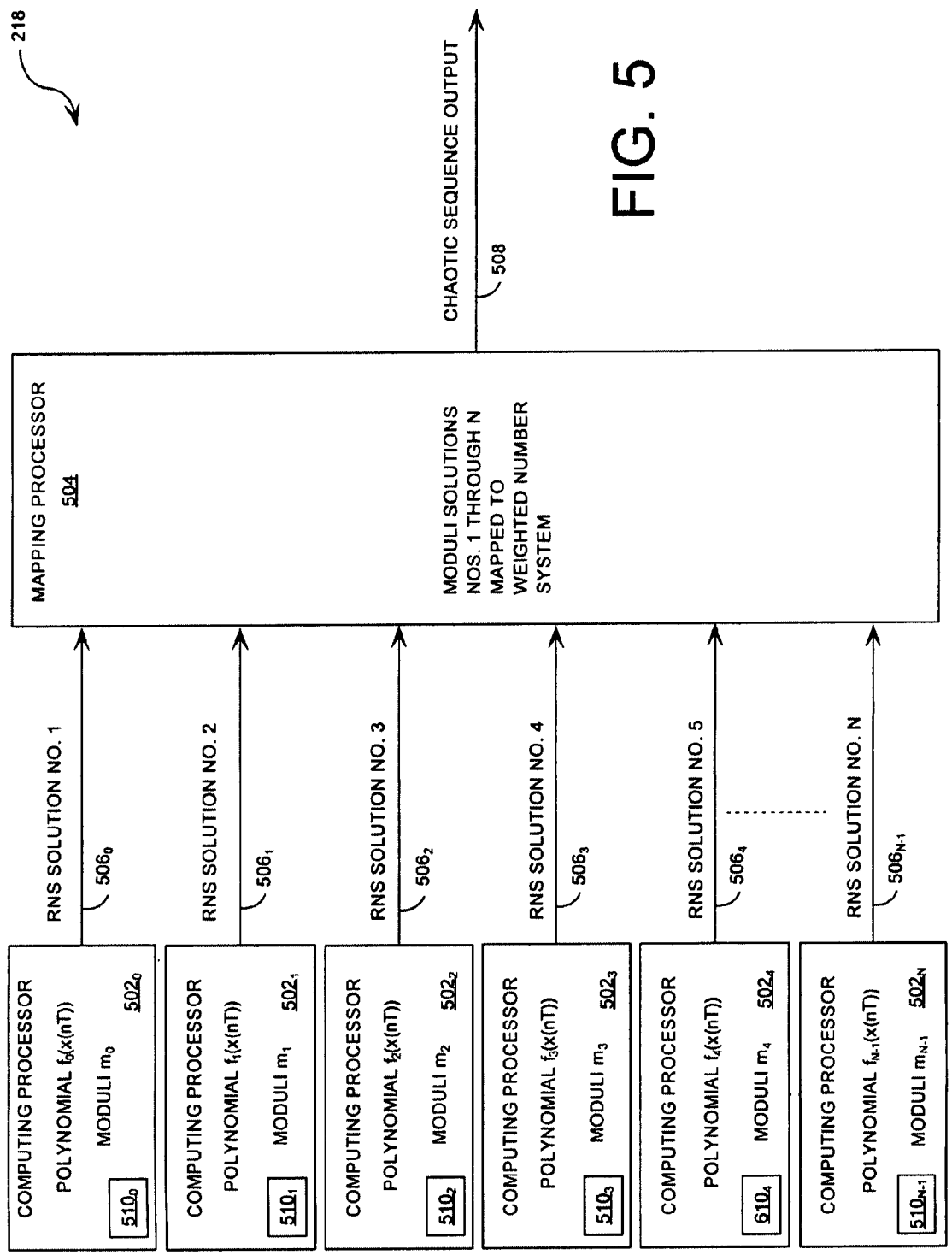
FIG. 5 is a block diagram of the chaos generator of FIGS. 2, 6-9 that is useful for understanding the invention.

Referring now to FIG. 5, there is illustrated one embodiment of a chaos generator 218. The chaos generator 218 is comprised of hardware and/or software configured to generate a digital chaotic sequence. In this regard, it should be appreciated that the chaos generator 218 is comprised of computing processors $502_0$-$502_{N-1}$. The chaos generator 218 is also comprised of a mapping processor 504. Each computing processor $502_0$-$502_{N-1}$ is coupled to the mapping processor 504 by a respective data bus $506_0$-$506_{N-1}$. As such, each computing processor $502_0$-$502_{N-1}$ is configured to communicate data to the mapping processor 504 via a respective data bus $506_0$-$506_{N-1}$. The mapping processor 504 can be coupled to an external device (not shown) via a data bus 508. In this regard, it should be appreciated that the external device (not shown) includes, but is not limited to, a communications device configured to combine or modify a signal in accordance with a chaotic sequence output.

Referring again to FIG. 5, the computing processors $502_0$-$502_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)), \ldots, f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $502_0$-$502_{N-1}$ employ modulo operations to calculate a respective solution for each polynomial equation $f_0(x(nT)), \ldots, f_{N-1}(x(nT))$ using modulo based arithmetic operations. Each of the computing processors $502_0$-$502_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $502_0$-$502_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $502_0$-$502_{N-1}$ are further comprised of hardware and/or software configured to utilize moduli $m_0, m_1, \ldots, m_{N-1}$ selected for each polynomial equation $f_0(x(nT)), \ldots,$ $f_{N-1}(x(nT))$ so that solutions iteratively computed via a feedback mechanism $510_0$-$510_{N-1}$ are chaotic. In this regard, it should be appreciated that the feedback mechanisms $510_0$-$510_{N-1}$ are provided so that the solutions for each polynomial equation $f_0(x(nT)), \ldots, f_{N-1}(x(nT))$ can be iteratively computed. Accordingly, the feedback mechanisms $510_0$-$510_{N-1}$ are comprised of hardware and/or software configured to selectively define a variable "x" of a polynomial equation as a solution computed in a previous iteration.

Referring again to FIG. 5, the computing processors $502_0$-$502_{N-1}$ are further comprised of hardware and/or software configured to express each of the RNS residue values in a binary number system representation. In this regard, the computing processors $502_0$-$502_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $502_0$-$502_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, the invention is not limited in this regard.

Referring again to FIG. 5, the mapping processor 504 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 504 can be comprised of hardware and/or software configured to determine the series of digits in the weighted number system based on the RNS residue values using a Chinese Remainder Theorem process. In this regard, it will be appreciated by those skilled in the art that the mapping processor 504 is comprised of hardware and/or software configured to identify a number in the weighted number system that is defined by the moduli solutions Nos. 1 through N.

According to an aspect of the invention, the mapping processor 504 can be comprised of hardware and/or software configured to identify a truncated portion of a number in the weighted number system that is defined by the moduli solutions Nos. 1 through N. For example, the mapping processor 504 can also be comprised of hardware and/or software configured to select the truncated portion to include any serially arranged set of digits of the number in the weighted number system. Further, the mapping processor 504 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 5, the mapping processor 504 is comprised of hardware and/or software configured to express a chaotic sequence in a binary number system representation. In this regard, it should be appreciated that the mapping processor 504 can employ a weighted-to-binary conversion method. Such methods are generally known to persons skilled in the art and therefore will not be described in great detail herein. However, it should be appreciated that any such method can be used without limitation.

A person skilled in the art will appreciate that the chaos generator 218 is one example of a chaos generator. However, the invention is not limited in this regard and any other chaos generator architecture can be used without limitation.

Architectures for Receiver 104 of FIG. 1

Figure 6:
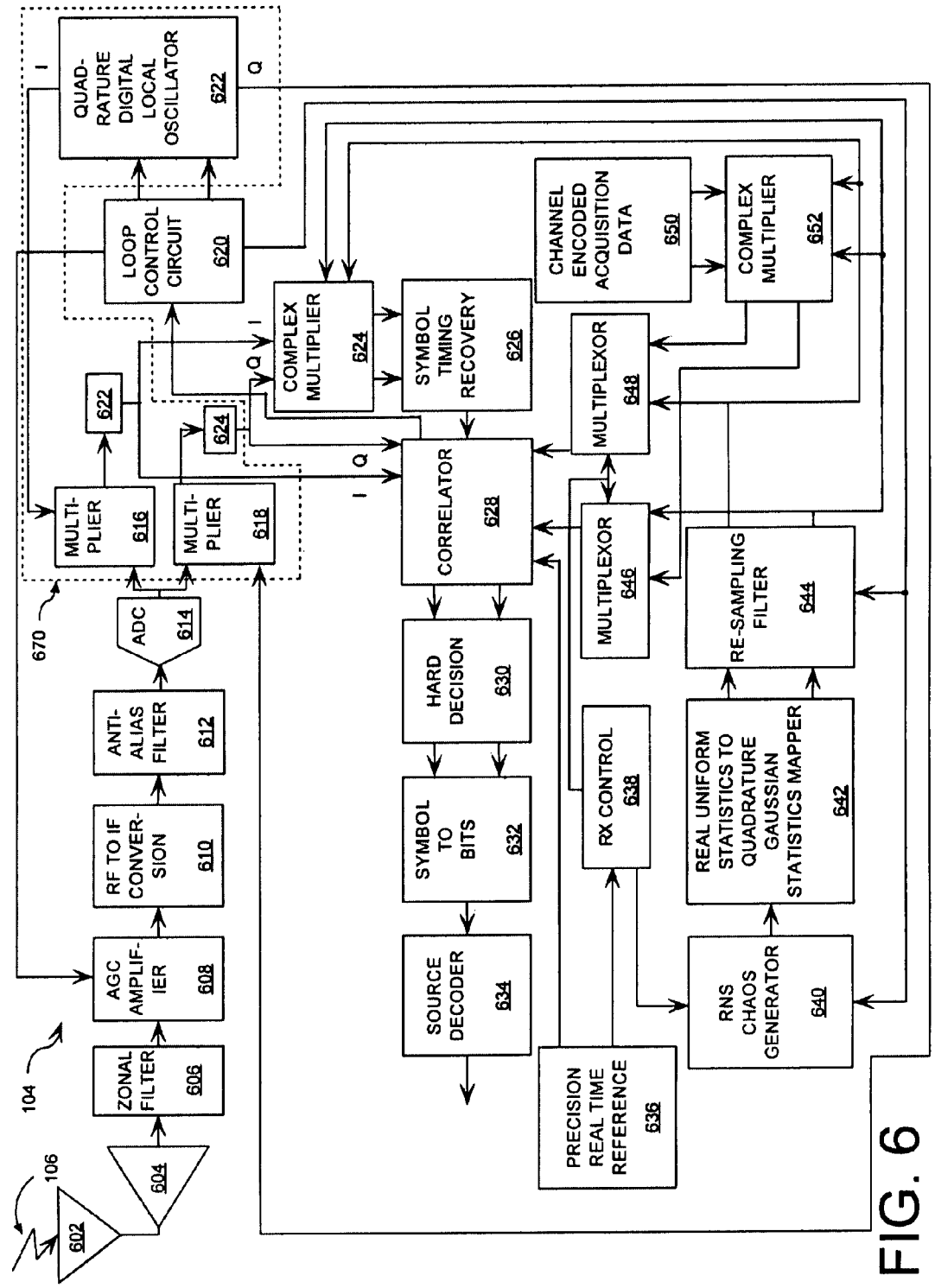
FIG. 6 is a block diagram of a first embodiment of the receiver shown in FIG. 1 that is useful for understanding the invention.

Referring now to FIG. 6, there is provided a block diagram of the receiver 104 of FIG. 1 that is useful for understanding the invention. It should be noted that in conventional analog based coherent communications systems analog chaos circuits are synchronized by periodically exchanging state information. The exchange of state information requires a substantial amount of additional bandwidth. This is what makes analog based coherent communications impracticable. The receiver 104 of FIG. 6 is designed to eliminate the drawbacks of conventional analog based coherent communications systems. In this regard, it should be appreciated that the receiver 104 is comprised of a digital chaos generator. The receiver 104 includes a tracking loop for synchronizing its digital chaos generator and the digital chaos generator 218 of the transmitter 102. Most significantly, the receiver 104 is configured to synchronize two (2) strings of discrete time chaotic samples (i.e., chaotic sequences) without using a constant or periodic transfer of state update information. A first string of discrete time chaotic samples is generated at the transmitter 102. A second string of discrete time chaotic samples is generated at the receiver 104.

Referring again to FIG. 6, the receiver 104 is comprised of an antenna element 602, a low noise amplifier (LNA) 604, a zonal filter 606, an AGC amplifier 608, a radio frequency (RF) to intermediate frequency (IF) conversion device 610, an anti-alias filter 612, and an analog-to-digital (A/D) converter 614. The receiver 104 is also comprised of real multipliers 616, 618, a loop control circuit 620, a quadrature digital local oscillator 622, a correlator 628, a multiplexers 646, 648, a channel encoded acquisition data generator (CEADG) 650, digital complex multipliers 624, 652, and a symbol timing recovery circuit 626. The receiver 104 is further comprised of a receiver controller 638, a precision real time reference clock 636, a hard decision device 630, a symbol to bits (S/B) converter 632, and a source decoder 634. The receiver 104 is comprised of a chaos generator 640, a real uniform statistic to quadrature Gaussian statistic mapper (RUQG) 642, lowpass filters 662, 664, and a re-sampling filter 644. Each of the above listed components and circuits 602-618, 622-626, 630-638, 642-652, 662, 664 are well known to persons skilled in the art. Thus, these components and circuits will not be described in great detail herein. However, a discussion of the receiver 104 architecture is provided to assist a reader in understanding the present invention. It should be noted that when the receiver 104 is in both acquisition and tracking modes (described below) the receiver 104 is utilizing a novel architecture/algorithm.

Referring again to FIG. 6, the antenna element 602 is configured to receive an analog input signal communicated from the transmitter 102 over a communications link. The antenna element 602 is also configured to communicate the analog input signal to the LNA 604. The LNA 604 is configured to amplify a received analog input signal while adding as little noise and distortion as possible. The LNA 604 is also configured to communicate an amplified, analog input signal to the zonal filer 606. Zonal filters are analog filters with slow roll off characteristic but low injection loss used to suppress large interfering signals outside of bands of interest. Zonal filters are well known to persons skilled in the art, and therefore will not be described in great detail herein. It should be appreciated that the zonal filter 606 is configured to communicate a filtered, analog input signal to the automatic gain control (AGC) amplifier 608.

The automatic gain control (AGC) amplifier 608 is a controllable gain amplifier used to keep the magnitude of the received signal within normal bounds for the rest of the signal processing chain. Automatic gain control (AGC) amplifiers are well known to persons skilled in the art, and therefore will not be described in great detail herein. It should be appreciated that the automatic gain control (AGC) amplifier 608 is configured to communicate a gain adjusted, analog input signal to the RF to IF conversion device 610.

The RF to IF conversion device 610 is configured to mix the analog input signal to a preferred IF for conversion to a digital signal at the A/D converter 614. The RF to IF conversion device 610 is also configured to communicate a mixed analog input signal to the anti-alias filter 612. The anti-alias filter 612 is configured to restrict a bandwidth of a mixed analog input signal. The anti-alias filter 612 is also configured to communicate a filtered, analog input signal to the A/D converter 614. The A/D converter 614 is configured to convert a received analog input signal to a digital signal. The A/D converter 614 is also configured to communicate a digital input signal to a second IF translator 670 which is comprised of the real multipliers 616, 618, lowpass filters 662, 664, and the programmable quadrature digital local oscillator 622.

The multiplier 616 is configured to receive a digital word as input from the A/D converter 614 and a digital word from the in-phase component of the quadrature digital local oscillator 622. The multiplier 616 multiplies the output of the A/D converter 614 by the in-phase component of the quadrature digital local oscillator 622. The multiplier 616 is also configured to communicate a digital output word.

The multiplier 618 is configured to receive a digital word as input from the A/D converter 614 and a digital word from the quadrature-phase component of the quadrature digital local oscillator 622. The multiplier 618 multiplies the output of the A/D converter 614 by the quadrature-phase component of the quadrature digital local oscillator 622. The multiplier 618 is also configured to communicate a digital output word.

The output of the multiplier 616 is passed to the input of the lowpass filter 662. The output of the multiplier 618 is passed to the input of the lowpass filter 664. The lowpass filters 662 and 664 are identical digital lowpass filters which pass one sideband of the baseband IF signal while attenuating the other sideband. This has the effect of forming a quadrature form of the baseband IF signal at the output of the second IF translator 670.

The quadrature digital local oscillator 622 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 620. Quadrature digital local oscillators are known to those skilled in the art, and therefore will not be described in detail herein.

The second IF translator 670 is configured to mix the digital input signal to a preferred IF for processing at the correlator 628 and the digital complex multiplier 624. The IF translator 670 is also configured to communicate a digital input signal to the correlator 628 and the digital complex multiplier 624. As will be appreciated by those skilled in the art, the output of the IF translator 670 can include an in-phase ("I") data and quadrature phase ("Q") data. As such, the IF translator 670 can communicate I and Q data to the correlator 628 and the digital complex multiplier 624.

The digital complex multiplier 624 is configured to perform a complex multiplication in the digital domain. In the complex-valued digital multiplier 624, the digital input signal from the IF translator 670 is multiplied by a digital representation of a chaotic sequence. The chaotic sequence is generated in the chaos generator 640. The chaos generator 640 communicates the chaotic sequence to the RUQG 642. In this regard, it should be appreciated that the chaos generator 640 is coupled to the receiver controller 638. The receiver controller 638 is configured to control the chaos generator 640 so that the chaos generator 640 generates a chaotic sequence with the correct initial state when the receiver 104 is in an acquisition mode and a tracking mode.

The RUQG 642 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. The RUQG 642 is further configured to communicate transformed chaotic sequences to the re-sampling filter 644.

According to the embodiment of the invention, the RUQG 642 statistically transforms a digital chaotic sequence into a quadrature Gaussian form of the digital chaotic sequence. The RUQG 642 communicates the quadrature Gaussian form of the digital chaotic sequence to the re-sampling filter 644. More particularly, the RUQG 642 communicates an in-phase ("I") data and quadrature phase ("Q") data to the re-sampling filter 644. Still, the invention is not limited in this regard.

The re-sampling filter 644 is also configured to forward a transformed chaotic sequence to the digital complex multiplier 624. The re-sampling filter 644 is configured as a sample rate change filter for making the chaos sample rate compatible with the received signal sample rate when the receiver 104 is in acquisition mode. The re-sampling filter 644 is also configured to compensate for transmit and receive clock offsets with less than a certain level of distortion when the receiver 104 is in a steady state demodulation mode. In this regard, it should be appreciated that the re-sampling filter 644 is configured to convert a sampling rate of in-phase ("I") and quadrature-phase ("Q") data sequences from a first sampling rate to a second sampling rate without changing the spectrum of the data contained in therein. The re-sampling filter 644 is further configured to communicate in-phase ("I") and quadrature-phase ("Q") data sequences to the digital complex multipliers 624, 652, and the multiplexers 646, 648.

It should be noted that if a sampled form of a chaotic sequence is thought of as discrete samples of a continuous band limited chaos then the re-sampling filter 644 is effectively tracking the discrete time samples, computing a continuous representation of the chaotic sequence, and re-sampling the chaotic sequence at the discrete time points required to match the discrete time points sampled by the A/D converter 614. In effect, input values and output values of the re-sampling filter 644 are not exactly the same because the values are samples of the same waveform taken at slightly offset times. However, the values are samples of the same waveform so the values have the same power spectral density.

Referring again to FIG. 6, the CEADG 650 is configured to generate a modulated acquisition sequence. The CEADG 650 is also configured to communicate a modulated acquisition sequence to the digital complex multiplier 652. The digital complex multiplier 652 is configured to perform a complex multiplication in the digital domain. This complex multiplication includes multiplying a modulated acquisition sequence from the CEADG 650 by a digital representation of a chaotic sequence to yield a reference for a digital input signal. The digital complex multiplier 652 is also configured to communicate reference signal to the multiplexers 646, 648. The multiplexer 646 is configured to route the quadrature-phase part of a reference signal to the correlator 628. The multiplexer 648 is configured to route the in-phase part of a reference signal to the correlator 628. In this regard, it should be appreciated that the multiplexers 646, 648 are coupled to the receiver controller 638. The receiver controller 638 is configured to control the multiplexers 646, 648 in tandem so that the multiplexers 646, 648 route the reference signal to the correlator 628 while the receiver 104 is in an acquisition mode (described below).

The correlator 628 is configured to correlate a locally generated chaotic sequence with a digital input signal. This correlation is performed at a symbol rate on symbol boundaries or at a symbol rate offset from symbol boundaries. As should be understood a "symbol rate" is a bit rate divided by the number of bits transmitted in each symbol. The symbol rate is measured in symbols-per-second, hertz or baud. The phrase "symbol boundary" as used herein refers to a beginning of a symbol and an end of a symbol.

It should be understood that the sense of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when the correlator 628 is in a steady state demodulation mode, the output of the correlator 628 is PSK symbol soft decisions. In this regard, it should be appreciated that soft information refers to soft-values (which are represented by soft-decision bits) that comprise information about the symbols contained in a sequence. In particular, soft-values are values that represent the probability that a particular symbol in a sequence is an estimate of its ideal value(s). For example, if a binary symbol is a BPSK symbol, then a soft-value for a particular bit can indicate that a probability of a bit being a one (1) is p(1)=0.3. Conversely, the same bit can have a probability of being a zero (0) which is p(0)=0.7.

The correlator 628 is also configured to communicate PSK soft decisions to the hard decision device 630 for final symbol decision making. The hard decision device 630 is configured to process the PSK soft decisions to form hard symbol decision and communicate the hard symbol decisions to the S/B converter 632. The S/B converter 632 is configured to convert symbols to a binary form. The S/B converter 632 is configured to communicate a binary data sequence to the source decoder 634. The source decoder 634 is configured to decode FEC applied at the transmitter and to pass the decoded bit stream to one or more external devices (not shown) utilizing the decoded data.

The correlator 628 is also configured to acquire initial timing information associated with a chaotic sequence, to acquire initial timing associated with a data sequence, and to track phase and frequency offset information between the chaotic sequence and a digital input signal. The correlator 628 is also configured to track input signal magnitude information between the chaotic sequence and a digital input signal.

Acquisition of initial timing information and tracking of input signal magnitude, phase and frequency offset information are now described in detail.

If the receiver 104 is in acquisition mode, then the receiver controller 638 monitors the precision real-time reference 636 and generates state vectors for the RNS chaos generator 640. The state vectors are generated by subtracting the worst case timing uncertainty from the precision real-time reference 636 clock value to ensure that the reference signal directed to the correlator 628 leads any signal received from the transmitter 102 via the channel 106 plus all processing delay times. The receiver controller 638 also configures the multiplexers 646, 648 to direct the channel encoded acquisition data that has been modulated by the locally generated chaos to the correlator 628. The receiver controller 638 also configures the correlator 628 to its acquisition mode configuration and synchronizes the channel encoded acquisition data with the RNS code generator 640.

While the receiver 104 is in acquisition mode, the correlator 628 is configured to continuously correlate the received signal with the locally generated chaotically spread channel encoded acquisition data until the result of the correlations is above a computed threshold. The correlation is performed in stepped frequency offsets to facilitate acquisition in the presence of frequency offsets between the received signal and the receiver's 104 center frequency. The bounds of the frequency offset sweep are fixed by the worst case offsets between transmitter 102 and receiver 104 reference oscillators (not shown). Once the correlation magnitude indicates that the onset of a new signal has been located, information is transferred from the correlator 628 to the loop control circuit 620. The loop control circuit 620 determines a plurality of values utilizing the information transferred from the correlator 628. More particularly, the loop control circuit 620 determines values for an initial coarse timing adjustment, an initial fine timing adjustment, an initial quadrature digital local oscillator 622 phase adjustment, an initial quadrature digital local oscillator 622 center frequency adjustment, and an initial gain adjustment of the AGC amplifier 608.

The initial coarse timing adjustment is used for resetting the state vector of the RNS chaos generator 640 so that the locally generated chaos is generated within a plus of minus half (½) sample time error of the received chaos. The initial fine timing adjustment is used to control the re-sampling filter 644 so that the chaos at the output of the re-sampling filter 644 is within a predefined small time offset from the received chaotic signal. The initial quadrature digital local oscillator 622 phase adjustment is used to assure that the baseband quadrature signal out of lowpass filters 662, 664 is phase aligned to produce nominal symbol decisions. The initial quadrature digital local oscillator 622 center frequency adjustment is used to assure proper ongoing tracking of necessary signal parameters. More particularly, the initial quadrature digital local oscillator 622 center frequency adjustment is used to assure that the baseband quadrature signal out of lowpass filters 662, 664 is within a predetermined maximum frequency offset. The initial gain adjustment of the AGC amplifier 608 is used to facilitate nominal symbol decisions.

Thereafter, the loop control circuit 620 performs actions to set an initial coarse timing parameter, an initial fine timing parameter, an initial quadrature digital local oscillator 622 phase parameter, an initial center frequency parameter, and initial gain parameter utilizing the determined values. Once these parameters are set and before the acquisition data sequence has expired, the receiver controller 638 sets the receiver mode to that of a steady state demodulation mode.

According to an embodiment of the invention, the complex multiplier 624 operates in conjunction with the symbol timing recovery circuit 626 to perform time offset running averages of the magnitudes of correlations of the received chaotic signal and the locally generated chaos to track symbol timing. Alternatively, this function could be incorporated into the correlator 628. The symbol timing recovery circuit 626 computes finite memory statistics and uses these statistics to make symbol timing decisions. The symbol timing decisions are communicated to the correlator 628 to control the onsets and durations of correlations between the received signal and the locally generated chaos. Still, the invention is not limited in this regard.

In the steady state demodulation mode, M upper bits of the in-phase and quadrature-phase result of the correlator 628 are transferred as soft decisions to the hard decision device 630. Higher resolution results are sent to the loop control circuit 620. The higher resolution results of the correlation that are sent to the loop control circuit 620 are used to calculate updates to automatic gain control (AGC) gain, coarse timing, fine timing, phase offset and phase offset trending. The results of these calculations are used to derive frequency offset. It will be appreciated by those skilled in the art that loop control calculations are accomplished based on statistical estimates rather than the typical noise filtered deterministic estimates used with traditional waveforms. This is due to the fact that chaos is inherently noise like. When estimating loop control parameters for systems operating on traditional waveforms, calculations are being performed on noise corrupted deterministic signals. With the present invention, loop control calculations are performed on known noise in the presence of unwanted noise. As such, the loop control circuit 620 performs control estimates via expected value and statistical moment calculations.

Referring again to FIG. 6, the loop control circuit 620 uses the magnitude and phase information to calculate the deviation of the input signal magnitude from a nominal range. The loop control circuit 620 also uses the phase and frequency offset information to synchronize a chaotic sequence with a digital input signal. The loop control circuit 620 is also configured to communicate the phase and frequency offset information to the quadrature digital local oscillator 622 portion of the IF translator 670 and gain deviation compensation information to the automatic gain control (AGC) amplifier 608. The loop control circuit 620 is further configured to communicate a retiming control signal to the re-sampling filter 644 and the RNS chaos generator 640.

The re-sampling filter 644 accepts fine timing control information from the loop control circuit 620 and adjusts for timing drifts between the transmitter 102 and the receiver 104 within plus or minus half (+/−½) of a chaos sample time. When the loop control circuit 620 calculates a timing offset beyond the bounds of plus or minus half (+/−½) of a chaos sample time, the coarse timing loop control advances or delays the RNS chaos generator 640 by one (1) iteration time and adjusts the fine timing control for a consistent aggregate timing control.

It should be understood that the digital generation of the digital chaotic sequence at the transmitter 102 and receiver 104 is kept closely coordinated under the control of a precision real time reference clock 636. The higher the precision of the clock 636, the closer the synchronization of the chaos generator 218 of the transmitter 102 and the chaos generator 640 of the receiver 104 shall be excluding the effects of processing delay differences and channel propagation times. It is the use of digital chaos generators 218, 640 that allow the states of the chaos generators to be easily controlled with precision, thus allowing coherent communication.

Referring again to FIG. 6, the precision real time reference clock 636 is a stable local oscillator locked to a precision real time reference, such as a GPS clock receiver or a chip scale atomic clock (CSAC). The precision real time reference clock 636 is configured to supply a high frequency clock to the clocked logic circuits 614, . . . , 652 while being locked to a lower frequency reference clock. The lower frequency reference clock supplies a common reference and a common real time of day reference to prevent a large drift between the states of the chaos generator 218 and the chaos generator 640 of the receiver 104 over an extended time interval.

The operation of the receiver 104 will now be briefly described with regard to an acquisition mode and a steady state demodulation mode.

Acquisition Mode:

In acquisition mode, the re-sampling filter 644 performs a rational rate change and forwards a transformed chaotic sequence to the digital complex multiplier 652. The CEADG 650 generates a modulated acquisition sequence and forwards the same to the digital complex multiplier 652. The digital complex multiplier 652 performs a complex multiplication in the digital domain. In the digital complex multiplier 652, a modulated acquisition sequence from the CEADG 650 is multiplied by a digital representation of a chaotic sequence to yield a reference for a digital input signal that was generated at the transmitter 102 to facilitate initial acquisition. The chaotic sequence is generated in the RNS chaos generator 640. The digital complex multiplier 652 communicates a reference signal to the multiplexers 646, 648.

The receiver controller 638 configures the multiplexers 646, 648 for directing the reference signal to the correlator 628. The receiver controller 638 also performs actions to place the correlator 628 in an acquisition mode. Thereafter, the multiplexers 646, 648 route the reference signal to the correlator 628. Upon receipt of the reference signal, the correlator 628 searches across an uncertainty window to locate a received signal state so that the RNS chaos generator 640 can be set with the time synchronized state vector. More particularly, the correlator 628 performs a correlation process to correlate the received signal with the locally generated reference signal. This correlation process is performed until the result of a correlation has a value greater than a computed threshold value. Upon completion of the correlation process, the correlator 628 communicates information to the loop control circuit 620.

The loop control circuit 620 determines values for an initial coarse timing adjustment, an initial fine timing adjustment, an initial quadrature digital local oscillator 622 phase adjustment, an initial quadrature digital local oscillator 622 center frequency adjustment, and an AGC amplifier 608 initial gain adjustment utilizing the received information. Subsequently, the loop control circuit 620 performs actions to set an initial coarse timing parameter, an initial fine timing parameter, an initial quadrature digital local oscillator 622 phase parameter, an initial center frequency parameter, and initial gain parameter utilizing the determined values. Once these parameters have been set, the receiver controller 638 performs actions to place the receiver 104 in a steady state demodulation mode.

Steady State Demodulation Mode:

In steady state demodulation mode, the correlator 628 tracks the correlation between the received modulated signal and the locally generated chaos close to the nominal correlation peak to generate magnitude and phase information as a function of time. The correlator 628 communicates M upper bits of the magnitude and phase output information to the hard decision block 630. The hard decision block 630 compares the magnitude and phase information to pre-determined thresholds to make hard symbol decisions. The correlator 628 also communicates high resolution results to the loop control circuit 620. The loop control circuit 620 applies appropriate algorithmic processing to the received information. The algorithmic processing is performed to calculate values for updating an automatic gain control (ACG) gain, a coarse timing, a fine timing, a phase offset, a frequency offset, and a magnitude of an input signal. The loop control circuit utilizes these calculated values to detect fixed correlation phase offsets, phase offsets that change as a function of time, and drifts in a received input signal's timing.

When the loop control circuit 620 detects fixed correlation phase offsets, the phase control of the quadrature digital local oscillator 622 is modified to remove the phase offset. When the loop control circuit 620 detects phase offsets that change as a function of time, it adjusts the re-sampling filter 644 which acts as an incommensurate re-sampler when the receiver 104 is in steady state demodulation mode or the frequency control of the quadrature digital local oscillator 622 is modified to remove frequency or timing offsets. When the loop control circuit 620 detects that the received digital input signal timing has "drifted" more than plus or minus a half (½) of a sample time relative to a locally generated chaotic sequence, the loop control circuit 620: (1) adjusts a correlation window in an appropriate temporal direction by one sample time; (2) advances or retards a state of the local chaos generator 640 by one iteration state; and (3) adjusts the re-sampling filter 644 to compensate for the time discontinuity. This loop control circuit 620 process keeps the chaos generator 218 of the transmitter 102 and the chaos generator 640 of the receiver 104 synchronized to within half (½) of a sample time.

If a more precise temporal synchronization is required to enhance performance, a re-sampling filter can be implemented as a member of the class of polyphase fractional time delay filters. This class of filters is well known to persons skilled in the art, and therefore will not be described in great detail herein.

As described above, a number of chaotic samples are combined with an information symbol at the transmitter 102. Since the transmitter 102 and receiver 104 timing are referenced to two (2) different precision real time reference clock 212, 636 oscillators, symbol timing must be recovered at the receiver 104 to facilitate robust demodulation. Symbol timing recovery can include: (1) multiplying a received input signal by a complex conjugate of a locally generated chaotic sequence using the complex multiplier 624; (2) computing an N point running average of the product where N is a number of chaotic samples per symbol time; (3) storing the values, the maximum absolute values of the running averages, and the time of occurrence; and (4) statistically combining the values at the symbol timing recovery circuit 626 to recover symbol timing. It should be noted that symbol timing recover can also be accomplished via an output of the correlator 628. However, additional correlator operations are needed in such a scenario. As should be appreciated, using a separate multiplier operation for this purpose adds additional capabilities to the receiver 104, such as the capability to correlate and post process over multiple correlation windows simultaneously to locate the best statistical fit for symbol timing.

In this steady state demodulation mode, the symbol timing recovery circuit 626 communicates symbol onset timing information to the correlator 628 for controlling an initiation of a symbol correlation. The correlator 628 correlates a locally generated chaotic sequence with a received digital input signal during the symbol duration. In this regard, it should be understood that the sense and magnitude of a real and imaginary components of the correlation is directly related to the values of the real and imaginary components of symbols of a digital input signal. Accordingly, the correlator 628 generates symbol soft decisions. The correlator 628 communicates the symbol soft decisions to the hard decision device 630 for final symbol decision making. The hard decision device 630 determines symbols using the symbol soft decisions. Thereafter, the hard decision device 630 communicates the symbols to the S/B converter 632. The S/B converter 632 converts the symbol decisions to a binary form. The S/B converter 632 is configured to communicate a binary data sequence to the source decoder 634. The source decoder 634 is configured to decide FEC applied at the transmitter 102 and pass the decoded bit stream to one or more external devices (not shown) utilizing the decoded data.

A person skilled in the art will appreciate that the receiver 104 is one example of a communications system receiver. However, the invention is not limited in this regard and any other receiver architecture can be used without limitation. For example, other embodiments of a receiver are provided in FIGS. 7, 8, and 9.

Figure 7:
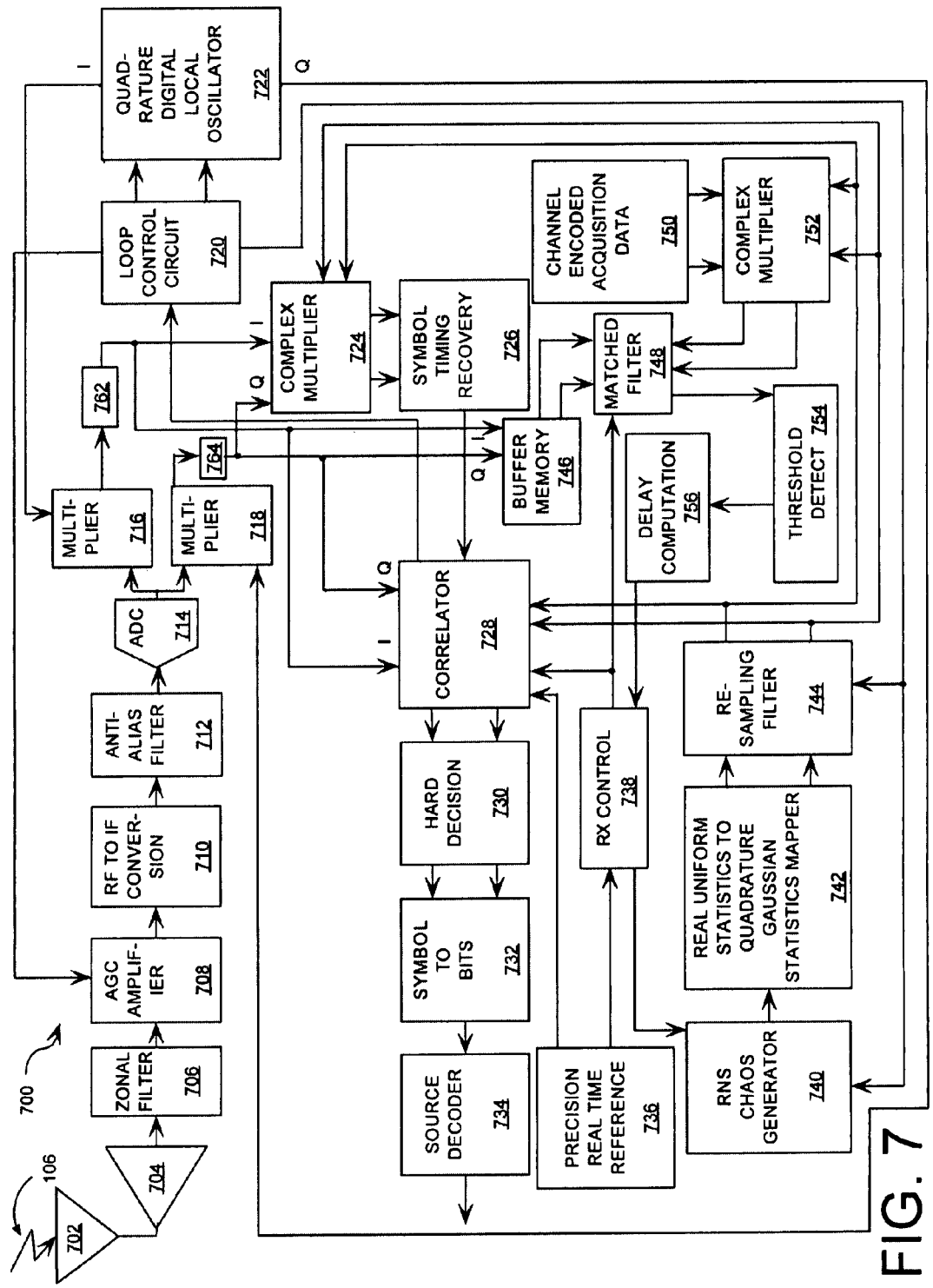
FIG. 7 is a block diagram of a second embodiment of the receiver shown in FIG. 1 that is useful for understanding the invention.

Referring now to FIG. 7, there is provided a block diagram of a second embodiment of the receiver of FIG. 1 that is useful for understanding the invention. As shown in FIG. 7, the receiver 700 is comprised of an antenna element 702, a low noise amplifier (LNA) 704, a zonal filter 706, an automatic gain control (AGC) amplifier 708, a radio frequency (RF) to intermediate frequency (IF) conversion device 710, an anti-alias filter 712, and an analog-to-digital (A/D) converter 714. The receiver 700 is also comprised of real multipliers 716, 718, a loop control circuit 720, a quadrature digital local oscillator 722, a correlator 728, a channel encoded acquisition data generator (CEADG) 750, digital complex multipliers 724, 752, and a symbol timing recovery circuit 726. The receiver 700 is further comprised of a receiver controller 738, a precision real time reference clock 736, a hard decision device 730, a symbol to bits (S/B) converter 732, and a source decoder 734. The receiver 700 is comprised of a chaos generator 740, a real uniform statistic to quadrature Gaussian statistic mapper (RUQG) 742, and a re-sampling filter 744. The receiver 700 is comprised of a buffer memory 746, a matched filter 748, a delay computation device 756, a threshold detect device 754, and lowpass filters 762, 764. Each of the above listed components and circuits 702-726, 730-744, 750-752, 762, 764 are the same or substantially similar to the respective components 602-626, 630-644, 650-652, 662, 664 of FIG. 6. As such, the above description is sufficient for understanding the components and circuits of FIG. 7. However, it should be noted that the steady state demodulation mode operations of the receiver 700 are the same or substantially similar to that of the receiver 104 (described above in relation to FIG. 6). The differences of the receiver 700 operations and the receiver 104 operations are in acquisition techniques.

Acquisition Mode:

In acquisition mode, an input to the receiver 700 is periodically sampled in blocks of samples. Each block of samples is stored in the buffer memory 746. Once a block of samples is stored in the buffer memory 746, the block of samples is repeatedly passed to the matched filter 748. The matched filter 748 correlates a known block of samples (or template) with the received block of samples to detect the presence of the template in the received block of samples.

According to an aspect of the invention, the matched filter 748 coefficients change on each pass of buffered data through the matched filter 748. This coefficient change accounts for a possible frequency offset. Further, the temporal length of the matched filter 748 is longer than the temporal length of the buffered data. This temporal length configuration accounts for timing uncertainty. Still, the invention is not limited in this regard.

Referring again to FIG. 7, the matched filter 748 communicates outputs to the threshold detect device 754. The threshold detect device 754 performs actions to compare the received outputs with a known threshold value. If the outputs of the matched filter 748 do not have a value that is greater than the known threshold value, then a new block of samples is sampled and stored in the buffer memory 746. This process is repeated until the output of the matched filter 748 has a value that exceeds the known threshold value. If the threshold detect device 754 detects an output having a value greater than the known threshold value, then the threshold detect device 754 communicates a signal to the delay computation device 756.

The delay computation device 756 monitors the time it took to sample an input into the receiver 700. The delay computation device 756 also tracks the frequency offsets used in the matched filter 748. The delay computation device 756 also monitors the amount of time it took to sample an input to the receiver 700 and detect a matched filter output having a value that exceeds the known threshold value. The delay computation device 756 utilizes the time and frequency offset information to compute a frequency offset and timing offset. The delay computation device 756 communicates the computed frequency offset and timing offset to the receiver controller 738. The receiver controller 738 performs actions to initialize the loop control circuit 720 by utilizing the received frequency offset and timing offset. Once initialized, the loop control circuit 720 fine tunes all loop control parameters before the receiver 700 is transitioned into a steady state demodulation mode.

Figure 8:
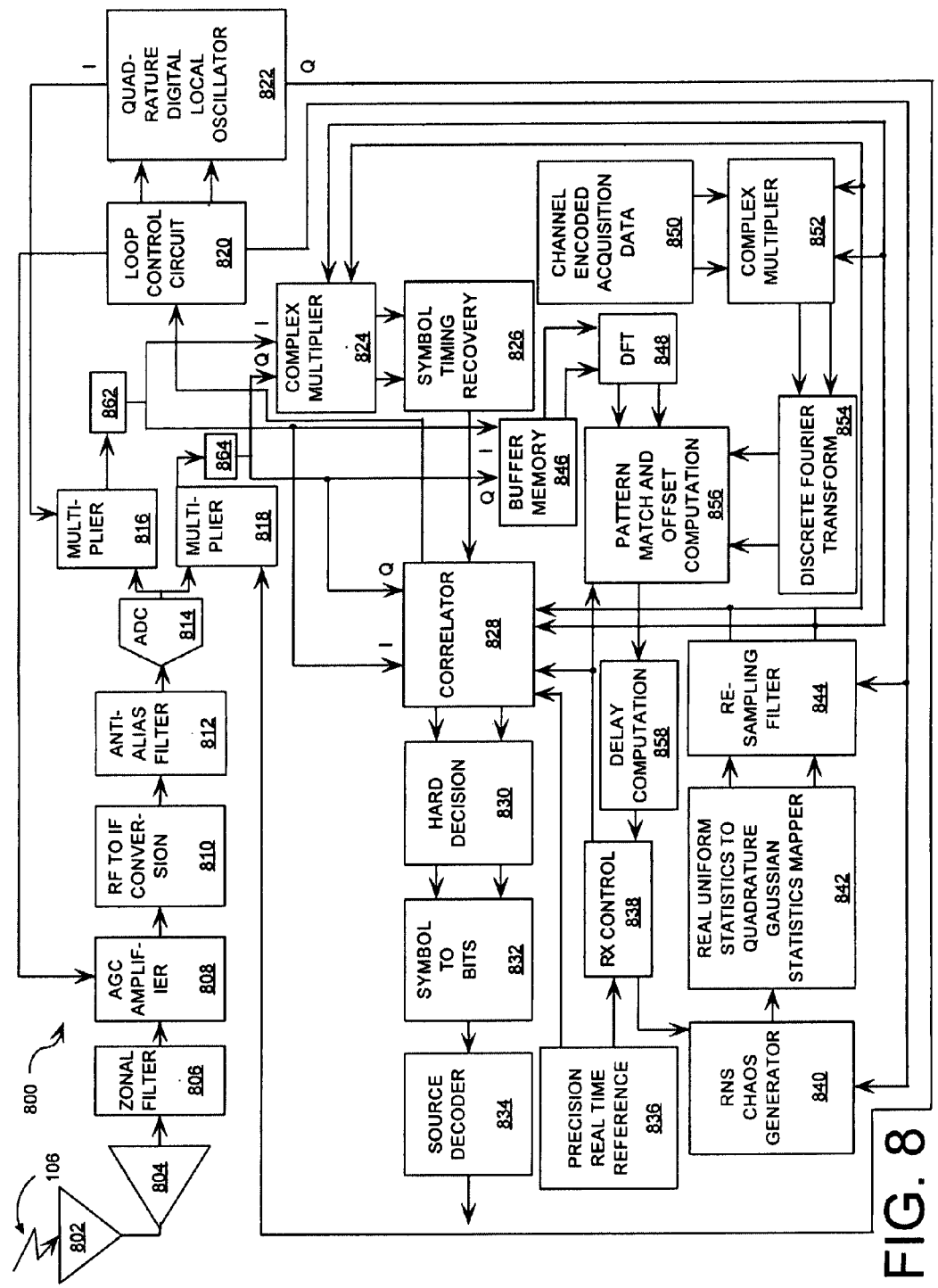
FIG. 8 is a block diagram of a third embodiment of the receiver shown in FIG. 1 that is useful for understanding the invention.

Referring now to FIG. 8, there is provided a block diagram of another embodiment of the receiver of FIG. 1 that is useful for understanding the invention. As shown in FIG. 8, the receiver 800 is comprised of an antenna element 802, a low noise amplifier (LNA) 804, a zonal filter 806, an automatic gain control (AGC) amplifier 808, a radio frequency (RF) to intermediate frequency (IF) conversion device 810, an anti-alias filter 812, and an analog-to-digital (A/D) converter 814. The receiver 800 is also comprised of real multipliers 816, 818, a loop control circuit 820, a quadrature digital local oscillator 822, a correlator 828, a channel encoded acquisition data generator (CEADG) 850, digital complex multipliers 824, 852, and a symbol timing recovery circuit 826. The receiver 800 is further comprised of a receiver controller 838, a precision real time reference clock 836, a hard decision device 830, a symbol to bits (S/B) converter 832, and a source decoder 834. The receiver 800 is comprised of a chaos generator 840, a real uniform statistic to quadrature Gaussian statistic mapper (RUQG) 842, and a re-sampling filter 844. The receiver 800 is comprised of a buffer memory 846, discrete Fourier transform (DFT) devices 848, 854, a pattern match and offset computation (PMOC) device 856, a delay computation device 858, and lowpass filters 862, 864. Each of the above listed components and circuits 802-826, 830-844, 850-852, 862, 864 are the same or substantially similar to the respective components 602-626, 630-644, 650-652, 662, 664 of FIG. 6. As such, the above description is sufficient for understanding the components and circuits of FIG. 8.

It should be noted that the steady state demodulation mode operations performed by the receiver 800 are the same or substantially similar to that of the receiver 104 (described above in relation to FIG. 6). As such, the description provided above in relation to FIG. 6 is sufficient for understanding the steady state demodulation mode of the receiver 800. However, the acquisition mode operations performed by the receiver 800 are different from the acquisition mode operations performed by the receivers 104, 700 (described above in relation to FIG. 6 and FIG. 7). Unlike the receivers 104, 700, the receiver 800 utilizes a frequency domain based acquisition method. A brief discussion of the frequency domain based acquisition method is provided below.

Acquisition Mode:

In acquisition mode, an input to the receiver 800 is periodically sampled in blocks of samples. Each block of samples is stored in the buffer memory 846. Once a block of samples is stored in the buffer memory 846, the block of samples is communicated to the DFT device 848. The DFT device 848 performs actions to transform the block of samples to a frequency domain utilizing a fast Fourier transform algorithm. The DFT device 848 communicates the block of samples in a frequency domain representation to the PMOC device 856.

The complex multiplier 852 computes an acquisition sequence and communicates the same to the DFT device 854. The DFT device 854 performs actions to transform the receiver acquisition sequence to a frequency domain utilizing a fast Fourier transform algorithm. The DFT device 854 communicates the acquisition sequence in a frequency domain representation to the PMOC device 856.

Upon receipt of the block of samples and the acquisition sequence, the PMOC device 856 performs actions to determine if a time alignment exists between the block of samples and the acquisition sequence. If the PMOC device 856 determines that a time alignment exists, then the PMOC device 856 performs actions to identify a phase and frequency offset pattern match of the two (2) spectrums. Upon identifying a phase and frequency offset pattern match, the PMOC device 856 communicates a signal to the delay computation device 858. The delay computation device 858 monitors the time it took to sample an input at the receiver 800. The delay computation device 858 also monitors the amount of time between completion of the sampling process and identification of a phase and frequency offset pattern match.

The PMOC device 856 also communicates frequency offset information, phase offset information, and peak power information to the delay computation device 858. In turn, the delay computation device 858 forwards the frequency offset information, phase offset information, and peak power information to the receiver controller 838. The receiver controller 838 distributes the received information to the loop control circuit 820. Thereafter, the receiver controller 838 performs actions to place the receiver 800 in a steady state demodulation mode.

Figure 9:
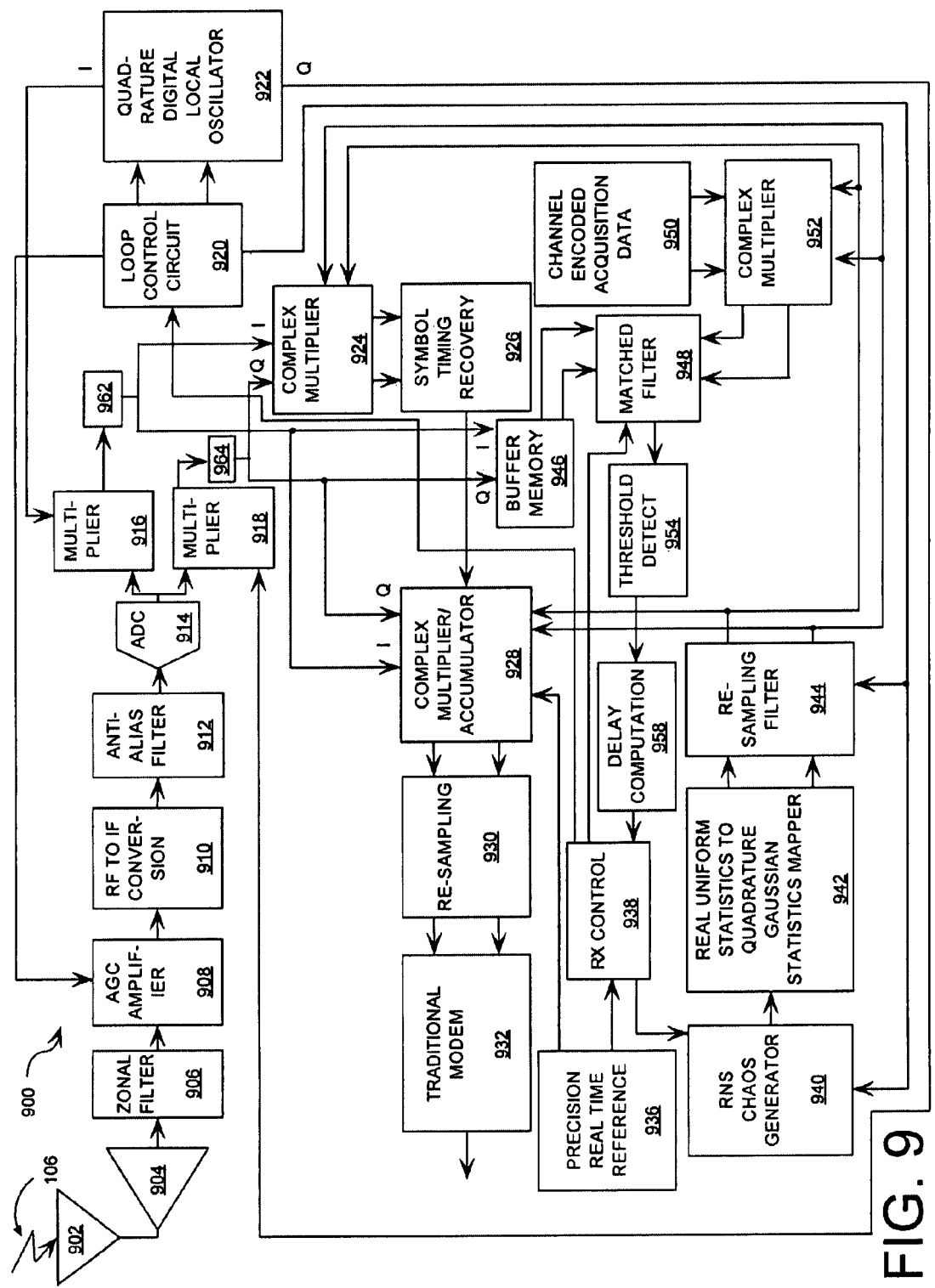
FIG. 9 is a block diagram of a fourth embodiment of the receiver shown in FIG. 1 that is useful for understanding the invention.

Referring now to FIG. 9, there is provided a block diagram of another embodiment of the receiver of FIG. 1 that is useful for understanding the invention. As shown in FIG. 9, the receiver 900 is comprised of an antenna element 902, a low noise amplifier (LNA) 904, a zonal filter 906, an automatic gain control (AGC) amplifier 908, a radio frequency (RF) to intermediate frequency (IF) conversion device 910, an anti-alias filter 912, and an analog-to-digital (A/D) converter 914. The receiver 900 is also comprised of real multipliers 916, 918, a loop control circuit 920, a quadrature digital local oscillator 922, a channel encoded acquisition data generator (CEADG) 950, digital complex multipliers 924, 952, and a symbol timing recovery circuit 926. The receiver 900 is further comprised of a symbol to bits (S/B) converter 926, a complex multiplier and accumulator (CMA) 928, a re-sampling device 930, a traditional modem 932, a precision real time reference clock 936, a receiver controller 938, and a delay computation device 958. The receiver 900 is comprised of a chaos generator 940, a real uniform statistic to quadrature Gaussian statistic mapper (RUQG) 942, and a re-sampling filter 944. The receiver 900 is comprised of a buffer memory 946, a matched filter 948, a threshold detect device 954, and lowpass filter 962, 964. Each of the above listed components and circuits 902-926, 936-944, 950-952, 962, 964 are the same or substantially similar to the respective components 602-626, 630-644, 650-652, 662, 664 of FIG. 6. As such, the above description is sufficient for understanding the components and circuits of FIG. 9.

It should be noted that the acquisition mode operations performed by the receiver 900 are the same as the acquisition mode operations performed by the receiver 700 (described above in relation to FIG. 7). As such, the description provided above in relation to FIG. 7 is sufficient for understanding the acquisition mode of the receiver 900. However, the steady state demodulation mode operations performed by the receiver 900 are different from the steady state demodulation mode operations performed by the receivers 104, 700, 800 (described above in relation to FIG. 6, FIG. 7, and FIG. 8). More particularly, data demodulation at the receivers 104, 700, 800 is performed as an inherent result of a symbol by symbol correlation. In contrast, data demodulation at the receiver 900 is accomplished in the prototype build with a traditional modem 932.

Steady State Demodulation Mode:

In the steady state demodulation mode, the CMA 928 performs a multiplication operation to multiply a received input signal by a conjugate of a locally generated, time aligned chaotic signal. The multiplication operation provides a point by point magnitude estimate of the in-phase and quadrature-phase signal components. The CMA 928 also performs an addition operation to obtain a plurality of sum values. These sum values are obtain by separately accumulating the in-phase and quadrature-phase components of the products for a symbol time or an integer sub-multiple of a symbol time. Thereafter, the CMA 928 communicates an output signal including the sum values to the re-sampling device 930.

Upon receipt of an output signal, the re-sampling device 930 determines whether an input sample rate of the traditional modem 932 is different than a sample rate of an output signal generated at the CMA 928. If the input sample rate is determined to be different from the sample rate of the output signal, then the re-sampling device 930 performs actions to convert the output signal from a first sample rate to a second sample rate. The second sample rate is equivalent to the input sample rate of the traditional modem 932. The re-sampling device 930 also performs actions to communicate the re-sampled output signal to the traditional modem 932. If the input sample rate is determined to be the same as the sample rate of the output signal, then the re-sampling device 930 communicates the output signal to the traditional modem 932. The traditional modem 932 performs demodulation processing on the signal received from the re-sampling device 930.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for coherently demodulating a chaotic sequence spread spectrum signal at a receiver circuit within a communications system, comprising:
   receiving, by said receiver circuit of said communications system, a chaotic sequence spread spectrum signal including a plurality of information symbols;
   generating, by said receiver circuit, a first string of discrete time chaotic samples by
      selecting a plurality of polynomial equations;
      using residue number system (RNS) arithmetic operations to respectively determine a plurality of solutions for said plurality of polynomial equations, said plurality of solutions iteratively computed and expressed as RNS residue values;
      determining a series of digits in a weighted number system based on said plurality of RNS residue values; and
   processing, by said receiver circuit, said chaotic sequence spread spectrum signal to identify a time offset and a frequency offset relative to said first string of discrete time chaotic samples, each of said discrete time chaotic samples having a shorter sample time interval than a duration of said plurality of information symbols.

2. The method according to claim 1, wherein said first string of discrete time chaotic samples is identical to a second string of discrete time chaotic samples generated at a transmitter.

3. The method according to claim 2, further comprising utilizing, by said receiver circuit, an accurate time reference to minimize a timing difference uncertainty and a frequency difference uncertainty between said first string of discrete time chaotic samples and said second string of discrete time chaotic samples.

4. The method according to claim 1, further comprising correlating, by said receiver circuit, said chaotic sequence spread spectrum signal with said first string of discrete time chaotic samples to obtain correlation outputs.

5. The method according to claim 4, wherein said correlating step is performed at a symbol rate on symbol boundaries or at a symbol rate offset from symbol boundaries.

6. The method according to claim 4, further comprising processing, by said receiver circuit, said correlation outputs to produce a plurality of soft symbol decisions, to track a symbol timing, to track a plurality of timing offsets, to track a plurality of frequency offsets, to track a plurality of phase offsets, and to track a received signal strength.

7. The method according to claim 6, further comprising processing, by said receiver circuit, said plurality of soft symbol decisions to form hard symbol decisions.

8. The method according to claim 6, further comprising utilizing, by said receiver circuit, tracked timing offset information to adjust a timing of said receiver circuit, to control a re-sampling of said chaotic sequence spread spectrum signal, or to control a re-sampling of said first string of discrete time chaotic samples.

9. The method according to claim 6, further comprising utilizing, by said receiver circuit, tracked frequency offset information to adjust a local oscillator so that a frequency of said local oscillator matches a frequency of said chaotic sequence spread spectrum signal.

10. The method according to claim 6, further comprising utilizing, by said receiver circuit, tracked phase offset information to correct a phase offset between said chaotic sequence spread spectrum signal and said first string of discrete time chaotic samples.

11. The method according to claim 6, further comprising utilizing, by said receiver circuit, tracked received signal strength information to adjust a gain for amplifying said chaotic sequence spread spectrum signal.

12. A chaotic spread spectrum communications system (CSSCS) receiver configured for coherently demodulating a chaotic sequence spread spectrum signal including a plurality of information symbols, comprising:
   a chaotic sequence generator configured for generating a first string of discrete time chaotic samples, said chaotic sequence generator comprising at least one electronic circuit configured for
      using residue number system (RNS) arithmetic operations to respectively determine a plurality of solutions for a plurality of polynomial equations, said plurality of solutions iteratively computed and expressed as RNS residue values, and
      determining a series of digits in a weighted number system based on said plurality of RNS residue values;
   said at least one electronic circuit further configured for processing said chaotic sequence spread spectrum signal to identify a time offset and a frequency offset relative to said first string of discrete time chaotic samples, each of said discrete time chaotic samples having a shorter sample time interval than a duration of said plurality of information symbols.

13. The CSSCS receiver according to claim 12, wherein said first string of discrete time chaotic samples is identical to a second string of discrete time chaotic samples generated at a transmitter.

14. The CSSCS receiver according to claim 13, further comprising an accurate time reference configured for minimizing a timing difference uncertainty and a frequency difference uncertainty between said first string of discrete time chaotic samples and said second string of discrete time chaotic samples.

15. The CSSCS receiver according to claim 12, further comprising a correlator configured for correlating said chaotic sequence spread spectrum signal with said first string of discrete time chaotic samples to obtain correlation outputs.

16. The CSSCS receiver according to claim 15, wherein said correlator is further configured for correlating said chaotic sequence spread spectrum signal with said first string of discrete time chaotic samples at a symbol rate on symbol boundaries or at a symbol rate offset from symbol boundaries.

17. The CSSCS receiver according to claim 15, wherein said correlator is further configured for processing said correlation outputs to produce a plurality of soft symbol decisions.

18. The CSSCS receiver according to claim 17, further comprising a hard decision device configured for processing said plurality of soft symbol decisions to form hard symbol decisions.

19. The CSSCS receiver according to claim 15, further comprising a loop control circuit configured for tracking a symbol timing, tracking a plurality of timing offsets, tracking a plurality of frequency offsets, tracking a plurality of phase offsets, and tracking a received signal strength.

20. The CSSCS receiver according to claim 19, wherein said loop control circuit is further configured for adjusting a timing of said CSSCS receiver utilizing tracked timing offset information, controlling a re-sampling of said chaotic sequence spread spectrum signal, or controlling a re-sampling of said first string of discrete time chaotic samples.

21. The CSSCS receiver according to claim 19, wherein said loop control circuit is further configured for adjusting a local oscillator utilizing tracked frequency offset information so that a frequency of said local oscillator matches a frequency of said chaotic sequence spread spectrum signal.

22. The CSSCS receiver according to claim 19, wherein said loop control circuit is further configured for correcting a phase offset between said chaotic sequence spread spectrum signal and said first string of discrete time chaotic samples utilizing tracked phase offset information.

23. The CSSCS receiver according to claim 19, wherein said loop control circuit is further configured for adjusting a gain of an amplifier utilizing tracked received signal strength information.

* * * * *